Jan. 3, 1967 C. H. CLARK ET AL 3,296,370
COMMUNICATIONS EQUIPMENT TRANSMITTER AND TAPE RECORDER
Original Filed April 3, 1962 20 Sheets-Sheet 1
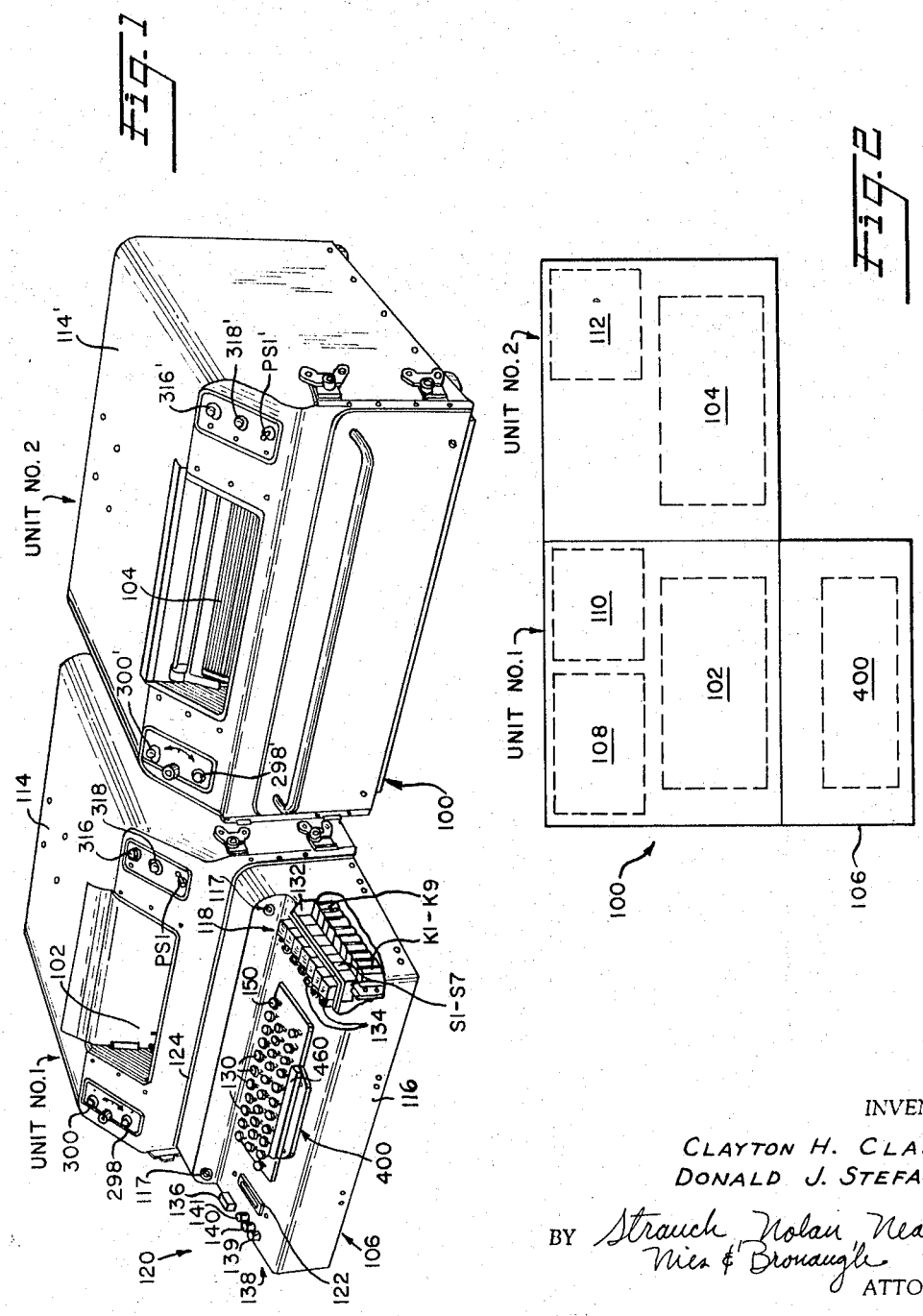
INVENTORS
CLAYTON H. CLARK
DONALD J. STEFANIK
BY Strauch Nolan Neale
Nies & Bronaugh
ATTORNEYS

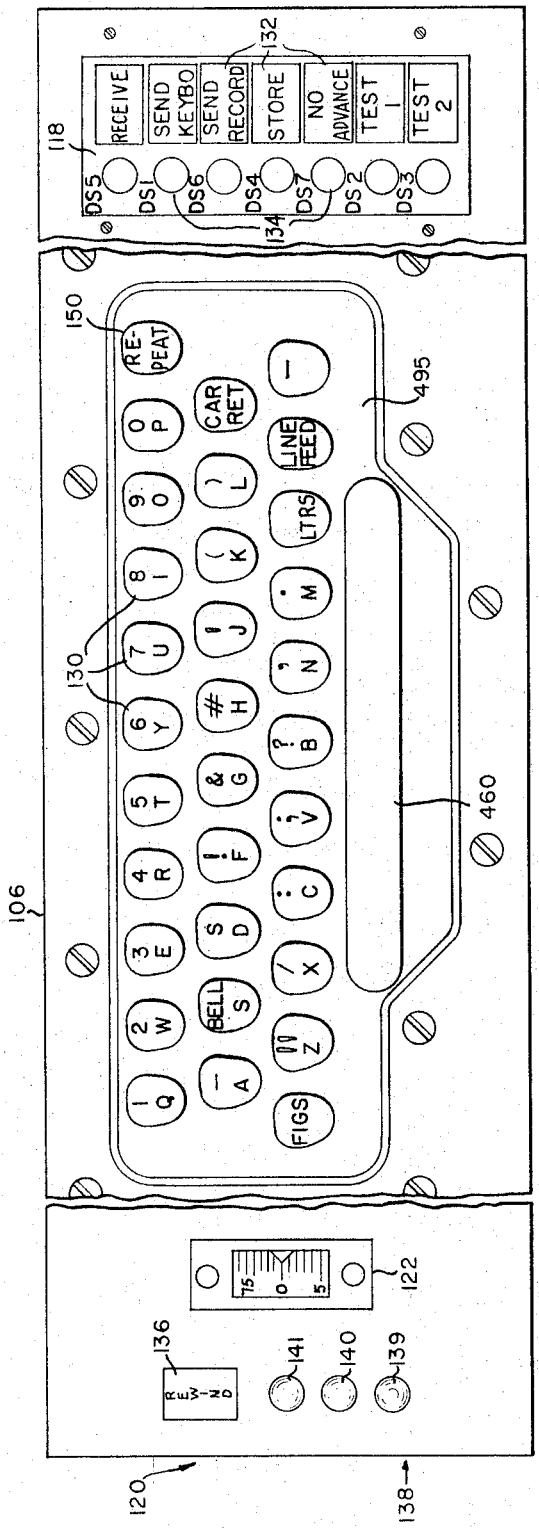
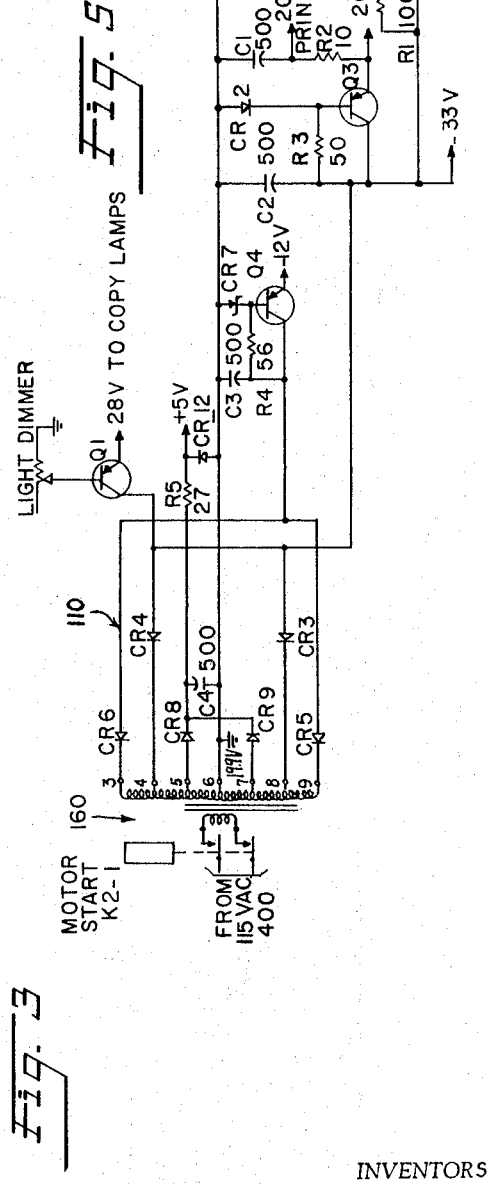

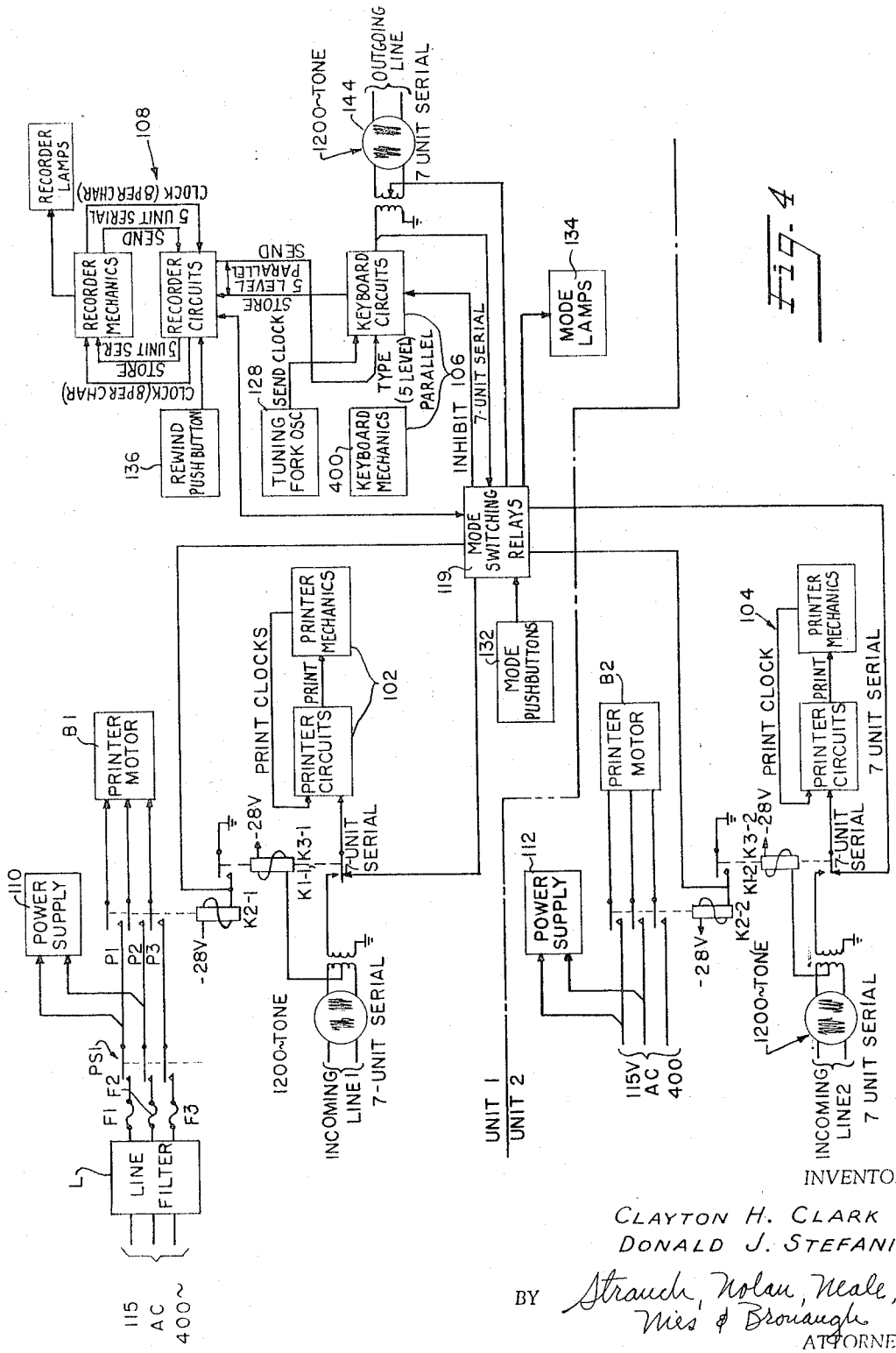

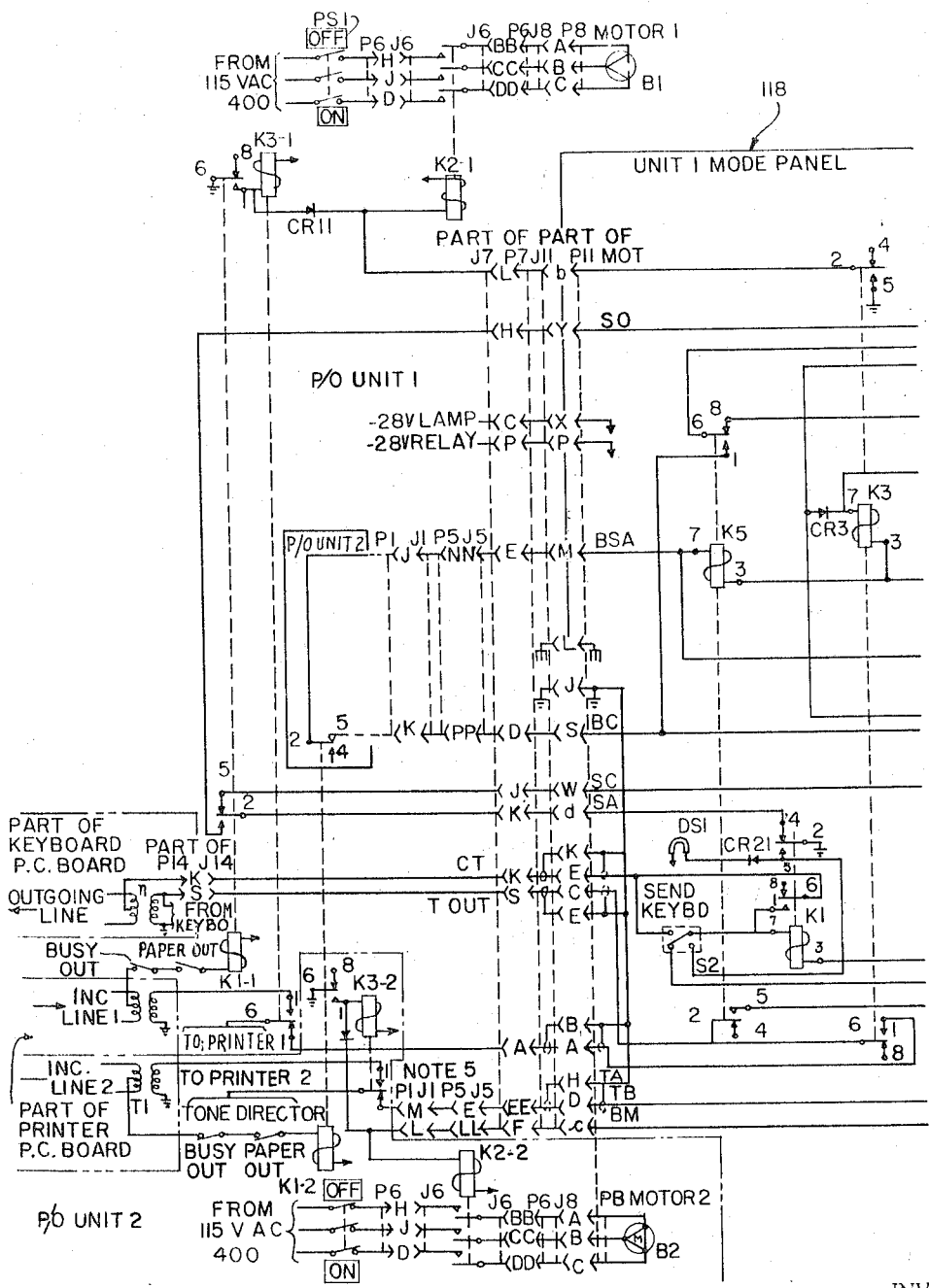

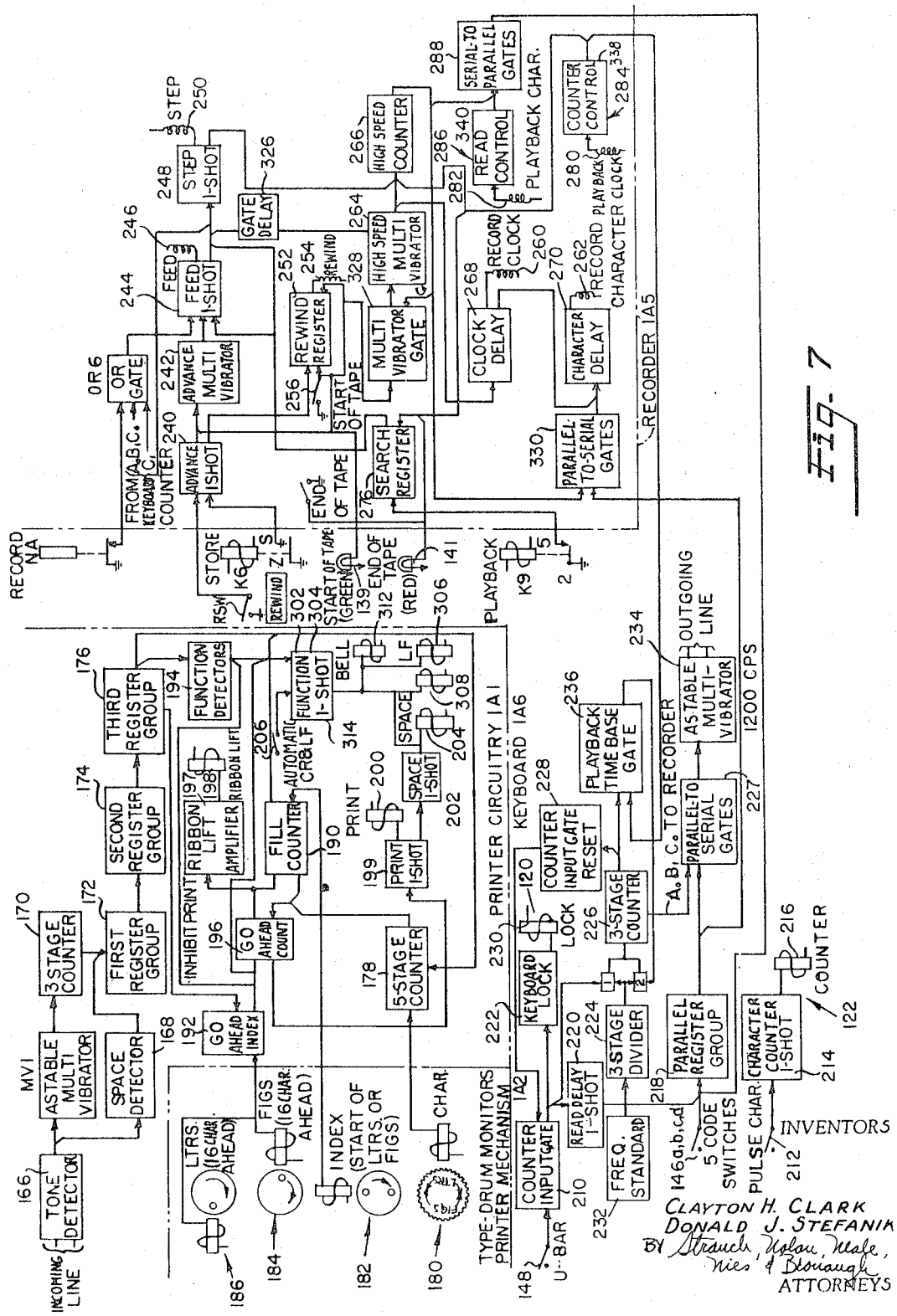

INVENTORS
CLAYTON H. CLARK
DONALD J. STEFANIK

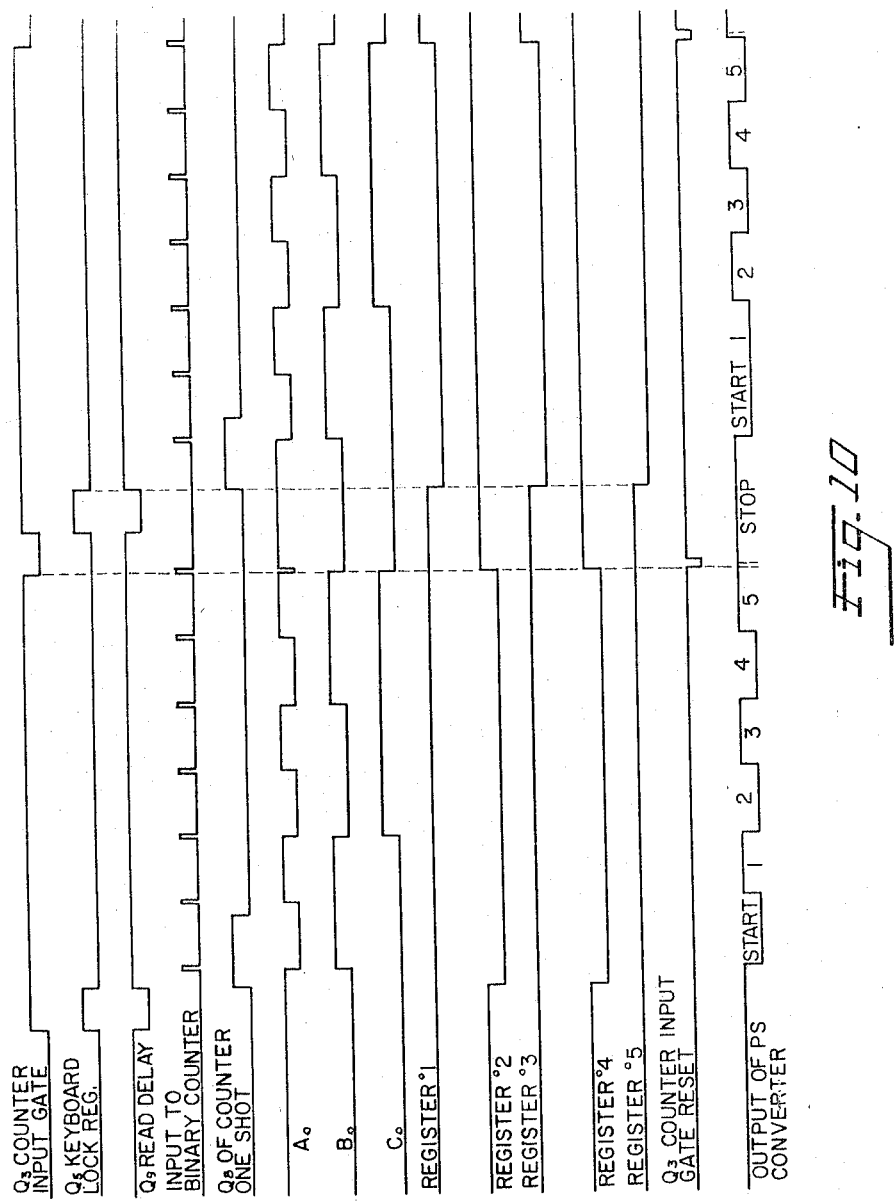

INVENTORS
CLAYTON H. CLARK
DONALD J. STEFANIK

Jan. 3, 1967  C. H. CLARK ET AL  3,296,370
COMMUNICATIONS EQUIPMENT TRANSMITTER AND TAPE RECORDER
Original Filed April 3, 1962  20 Sheets-Sheet 18

INVENTORS
CLAYTON H. CLARK
DONALD J. STEFANIK

BY Strauch, Nolan, Neale,
Nies & Bronaugh
ATTORNEYS

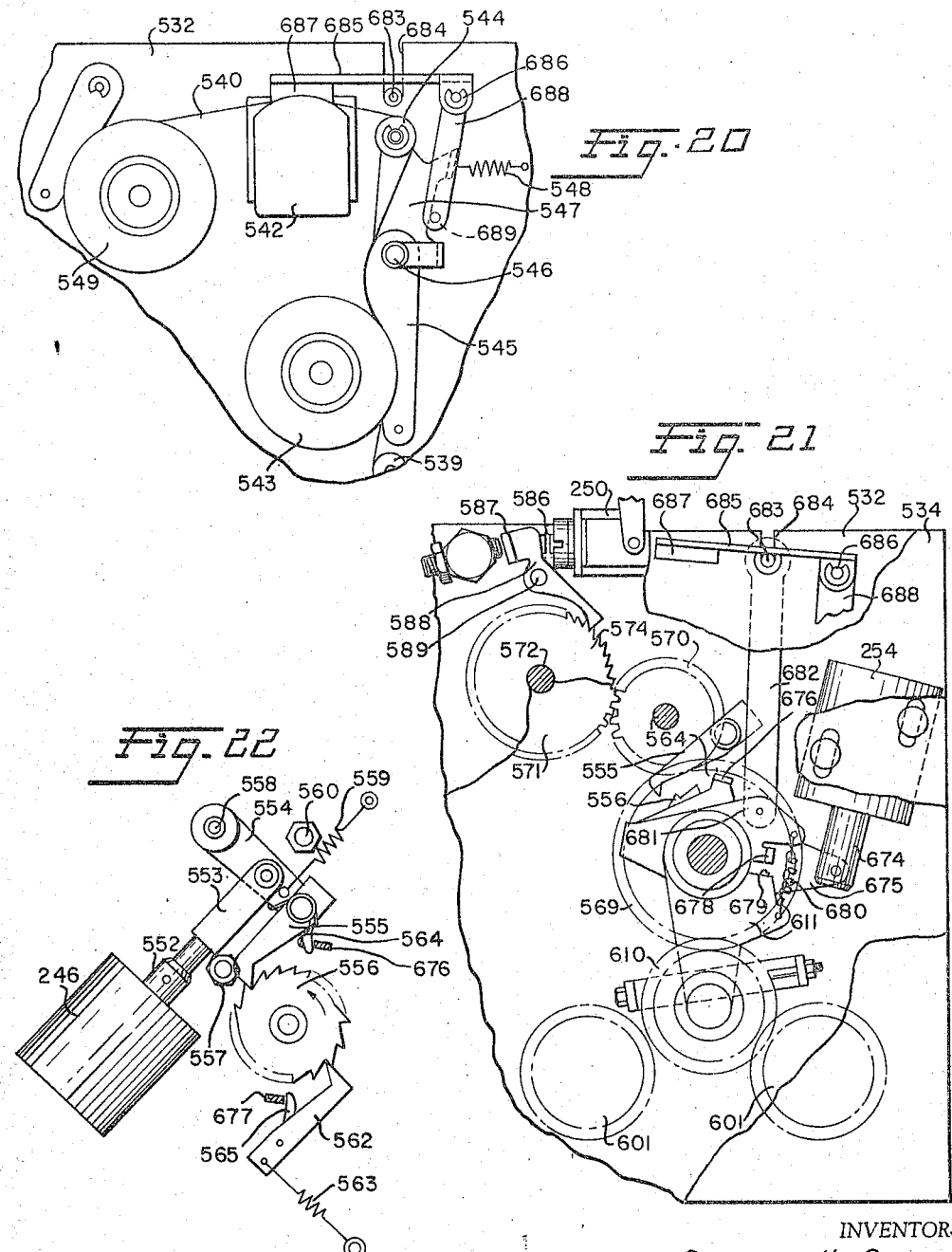

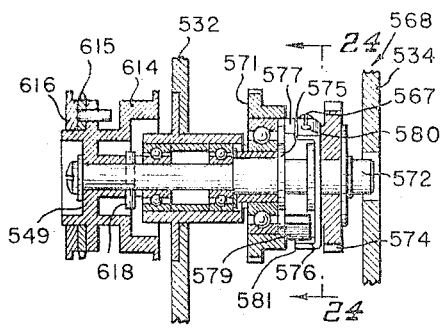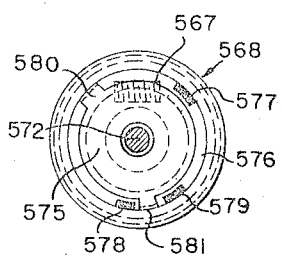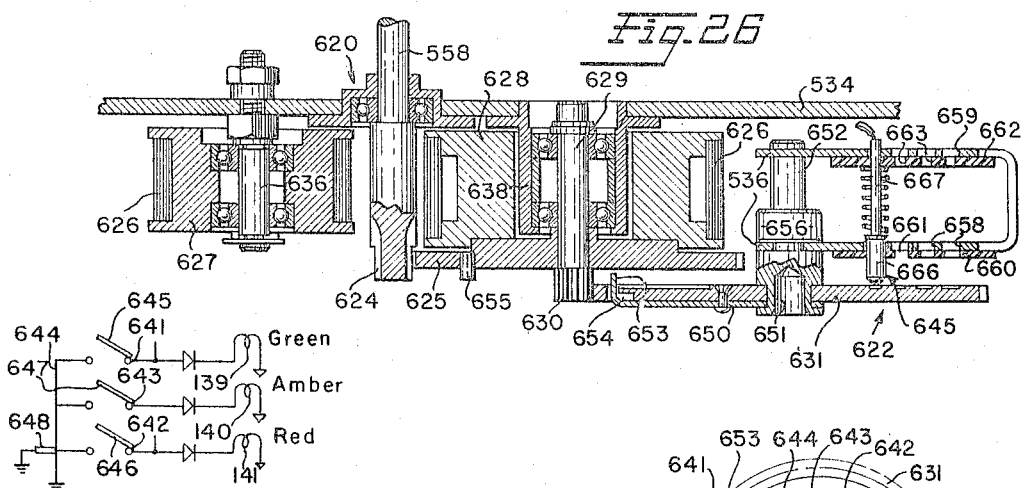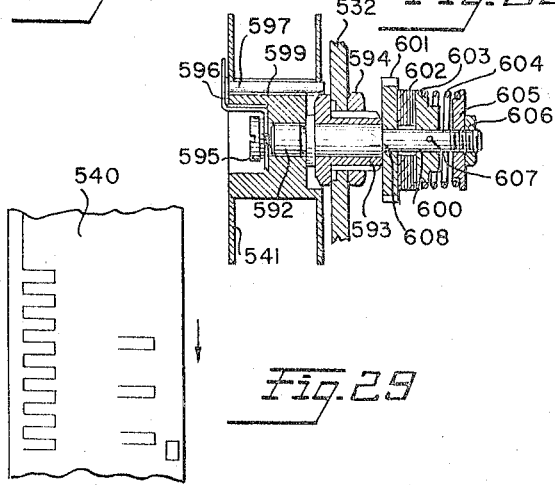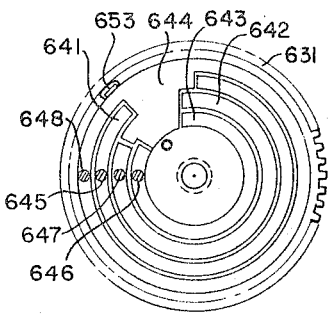

United States Patent Office 3,296,370
Patented Jan. 3, 1967

3,296,370
COMMUNICATIONS EQUIPMENT TRANSMITTER
AND TAPE RECORDER
Clayton H. Clark, Mundelein, and Donald J. Stefanik,
Berwyn, Ill., assignors to SCM Corporation, New York,
N.Y., a corporation of New York
Original application Apr. 3, 1962, Ser. No. 184,820.
Divided and this application Aug. 23, 1965, Ser. No.
481,799
7 Claims. (Cl. 178—17)

This invention relates to a communications equipment set, primarily intended for use in telegraphic communication although it may be adapted for use with other data processing applications. It is particularly related to an encoding keyboard transmitter and a magnetic tape recorder with related control equipment. This application is a division of co-pending application 184,820, filed April 3, 1962.

This equipment was developed to serve a telegraphic station use which required two or more interconnected teletypewriter sets with provision for utilizing simultaneous sending and receiving, for example, two separate line calls should be capable of being received on the two printers while a third call is being simultaneously sent on another line from the keyboard or the recorder.

The inventive equipment is versatile, compact and reliable and to this end, various new concepts of mechanism and operation are incorporated in a small transmitter with keyboard in combination with a completely new, extremely small, magnetic tape recorder capable of remote control of record, rewind and playback operations together with various electronics which interrelate the major transmitter and recorder subcomponents during the different modes of operation.

Accordingly, a primary object resides in the provision of a novel combination of encoding transmitter unit with a magnetic tape recorder-reader unit utilizing correlated electronic control circuits.

A further object resides in the provision of a novel keyboard and tape recorder combination having interrelated electronic controls: the keyboard being constructed to mechanically encode key selected characters (or functions) to transfer the code to keyboard electronics circuits in parallel registered form and to selectively transfer such parallel form signal information (1) into recorder electronics or (2) into the inter-related electronics for conversion to line speed serial code form and transmission to a signal line; the recorder having electronic controls enabling (1) receipt of parallel keyboard signals and conversion of such signals into high speed serial digital pulses together with coincidence synchronizing pulses and recording each coded signal and its coincidence synchronizing pulses in parallel to record tracks on record tape, or (2) transmission by playback and high speed electronic conversion of the played back recorded serial pulses into parallel pulses passed into the electronic keyboard parallel register and hence through the inter-related electronics for conversion to line speed serial code fom and transmission to a signal line.

Still another object in conjunction with the novel combination of keyboard and recorder resides in the provision of a novel keyboard transmission inhibitor circuit in the keyboard and recorder inter-related electronics initiated by playback operation of the recorder to electronically prevent keyboard initiated parallel registration of an encoded code signal. A further object resides in the provision of a similar electronic inhibiting of keyboard encoding, rendered operative when the combination is in a STORE mode and the recorder has reached an end-of-tape position.

Further novel features and other objects of this invention will become apparent from the following detailed description, discussion and the appended claims taken in conjunction with the accompanying drawings showing a preferred combination, subcomponent structures, electronics and embodiments, in which:

FIGURE 1 is a perspective view of a teletypewriter set constructed in accord with the present invention with Unit 1 on the left and Unit 2 on the right;

FIGURE 2 is a diagrammatic plant view representing the general layout of the units and the major subcomponents, the latter being illustrated by dotted lines;

FIGURE 3 is a plan view of the keyboard illustrating the key arrangement, indicators and the mode control for the set;

FIGURE 4 is a block diagram illustrating the operating functions of the complete teletypewriter set depicted in FIGURE 1;

FIGURE 5 is a simplified schematic of a power supply circuit, one of which is included with each of Units 1 and 2 in a set;

FIGURE 7 is a block diagram more detailed than FIGURE 4, illustrating general electrical, electronic and mechanical components utilized in Unit 1 which includes a keyboard, a printer and a recorder together with a power supply (not shown in this figure);

Figure 8:
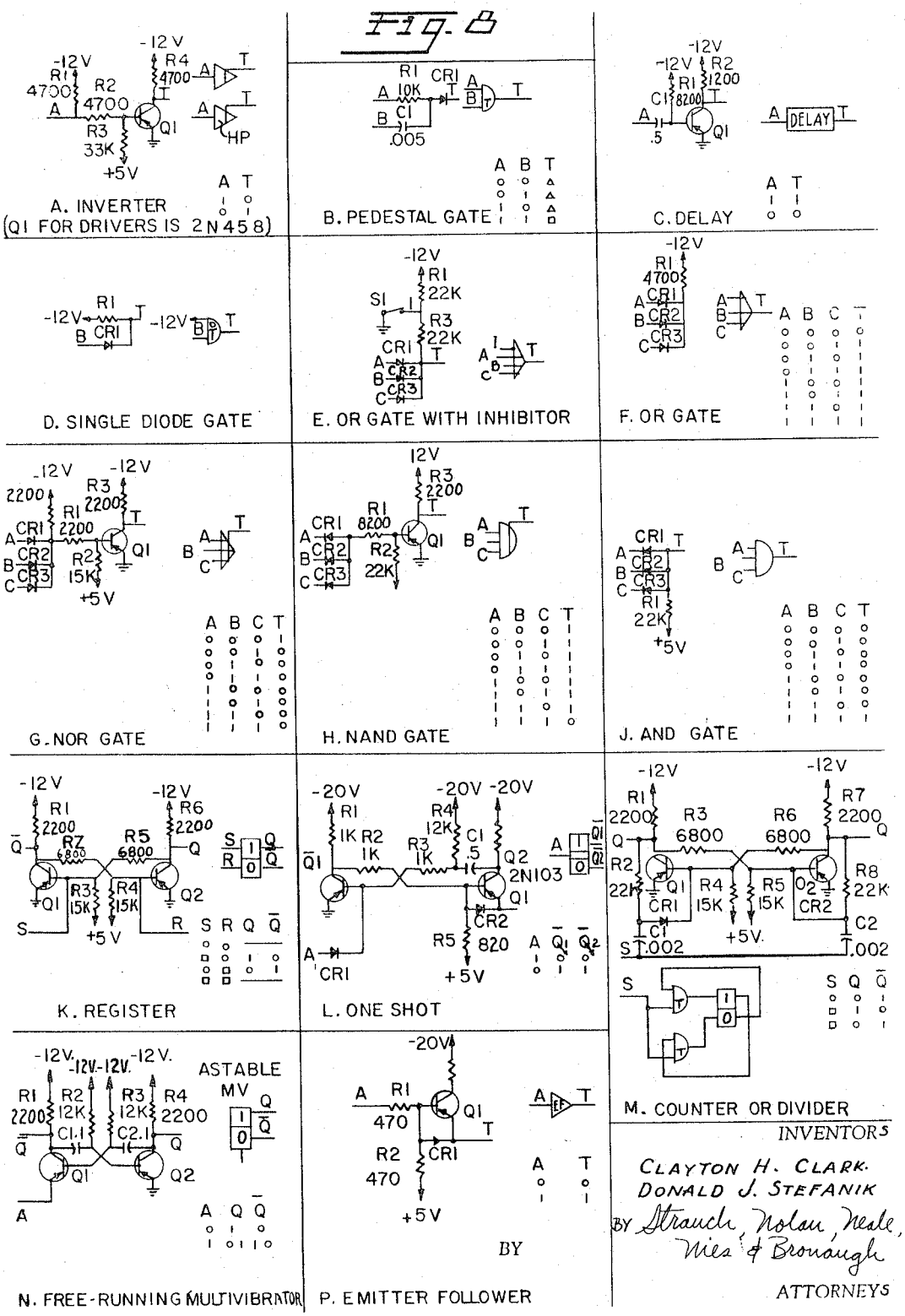
Figure 9A:
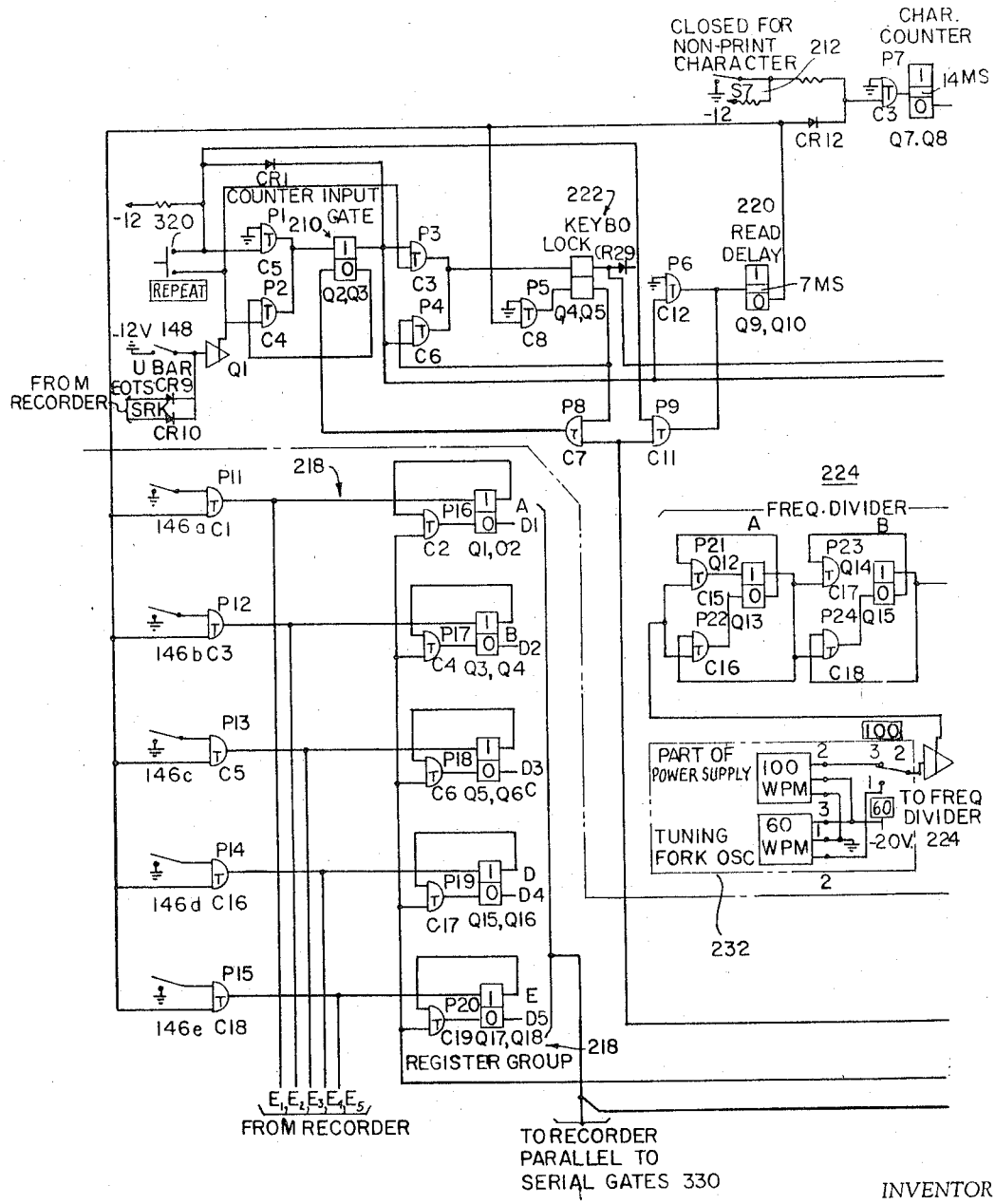
Figure 9B:
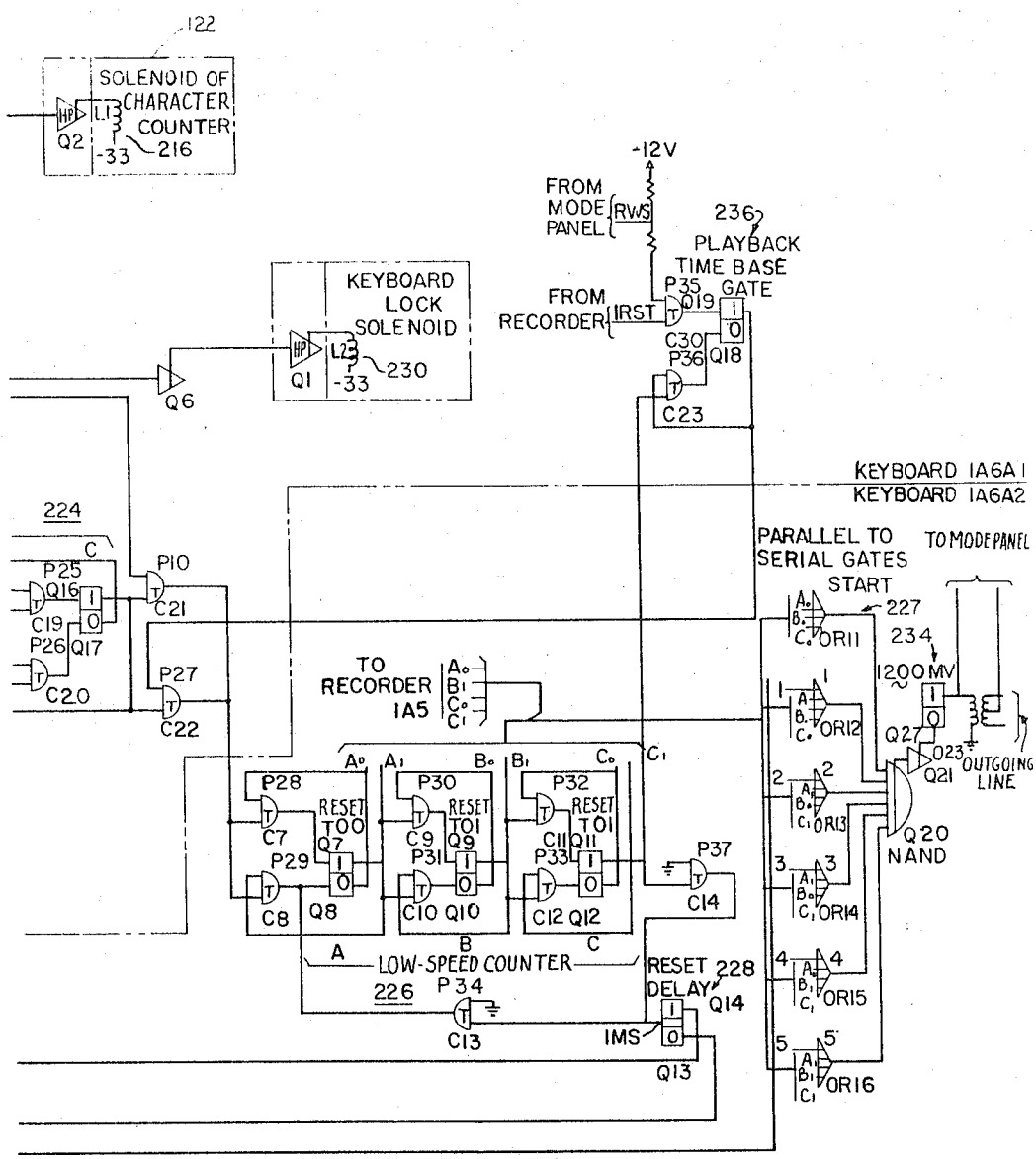
Figure 11A:
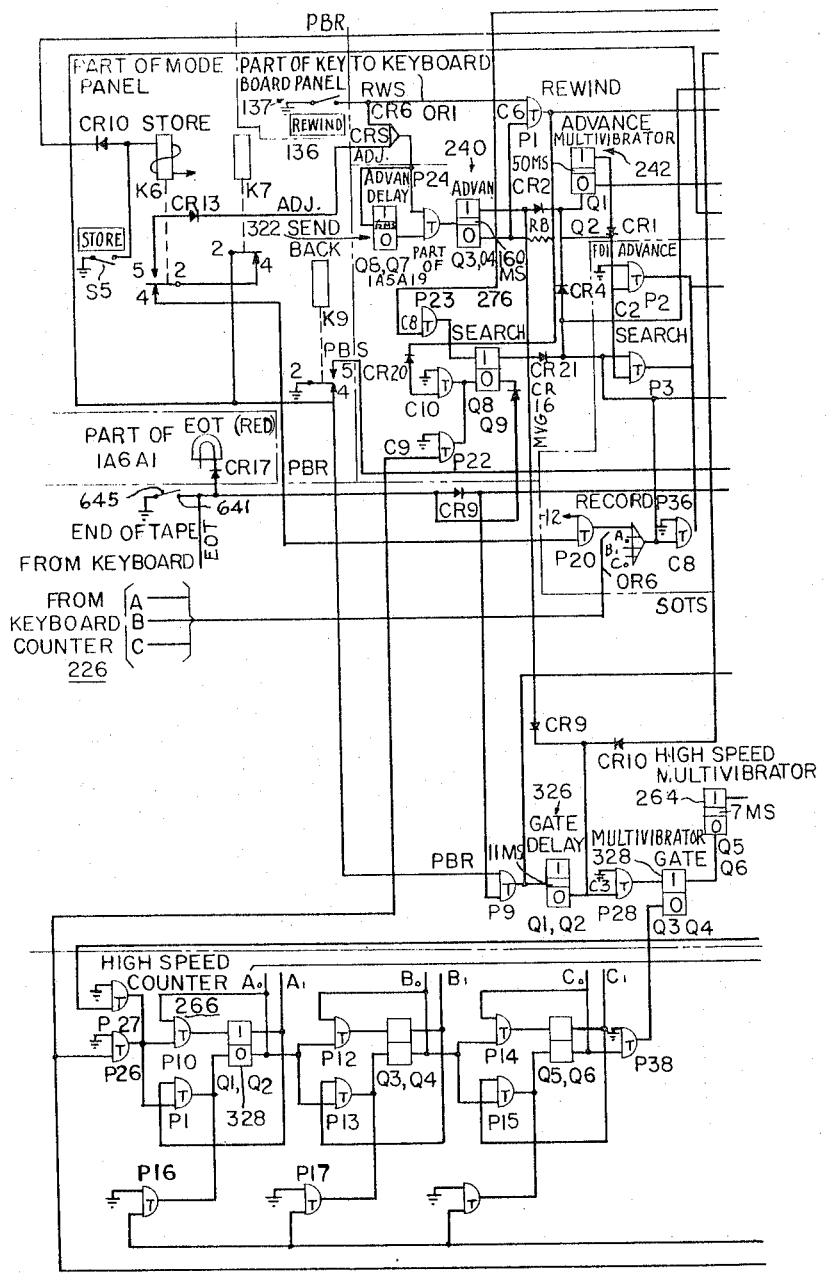
Figure 11B:
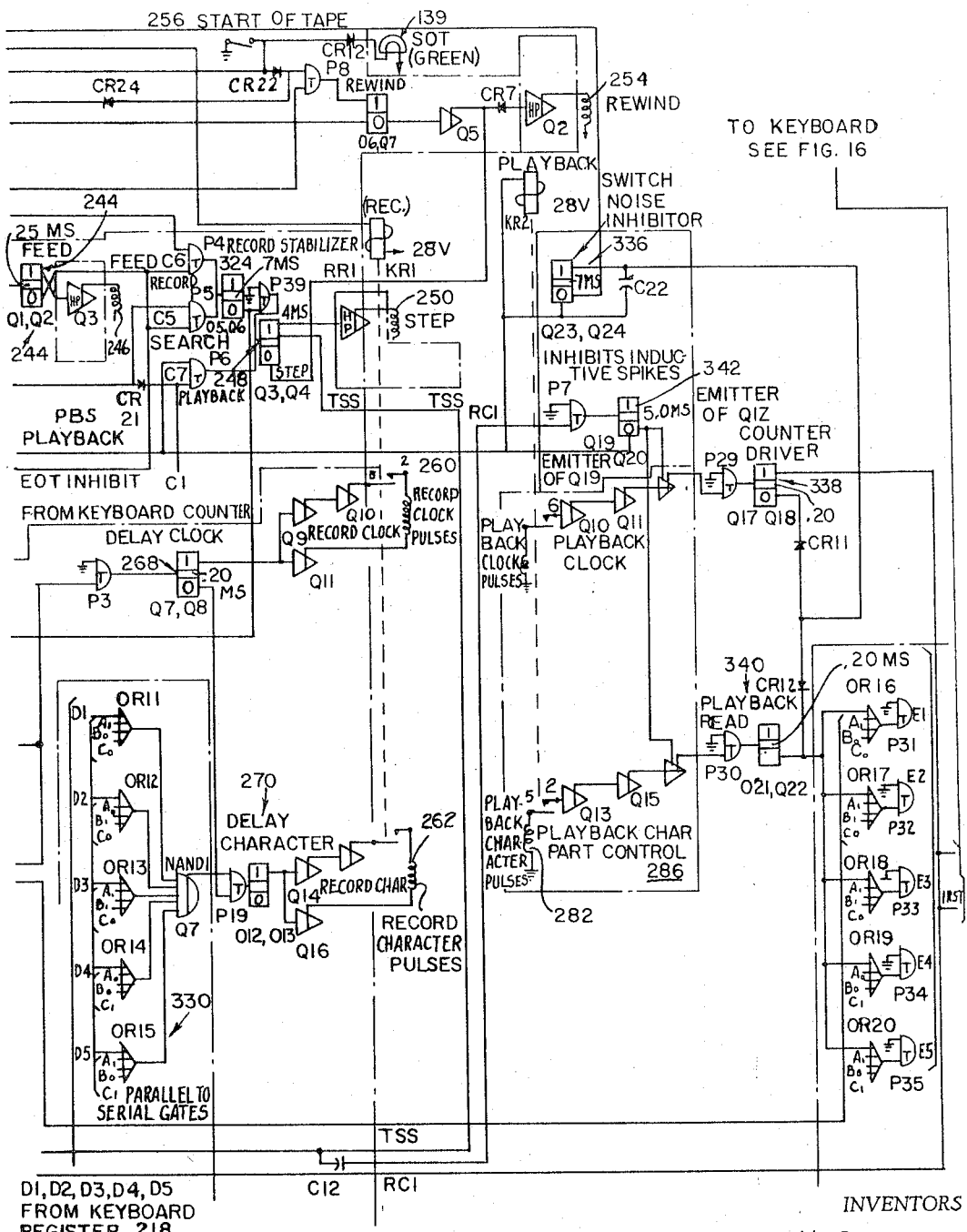
Figure 12:
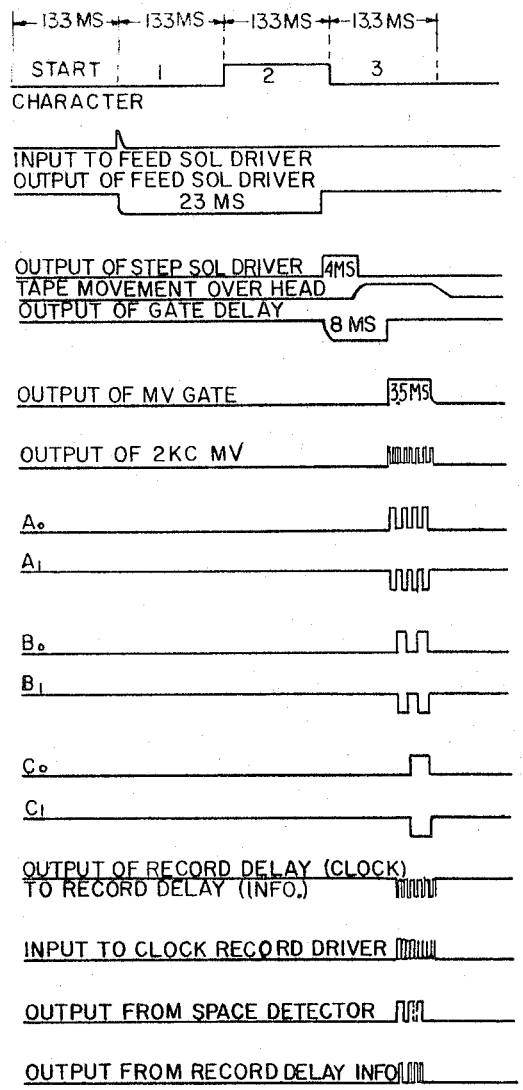
Figure 13:
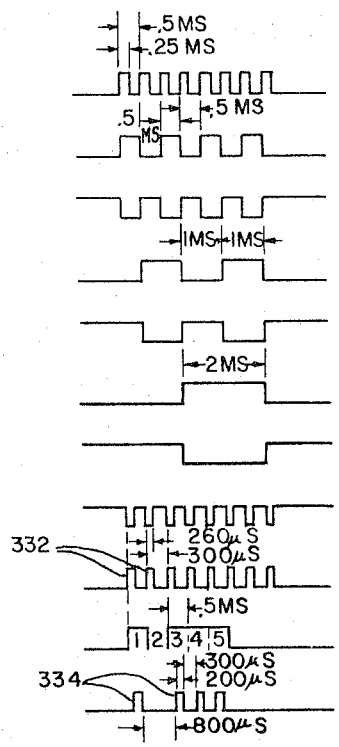
Figures 14, 15:
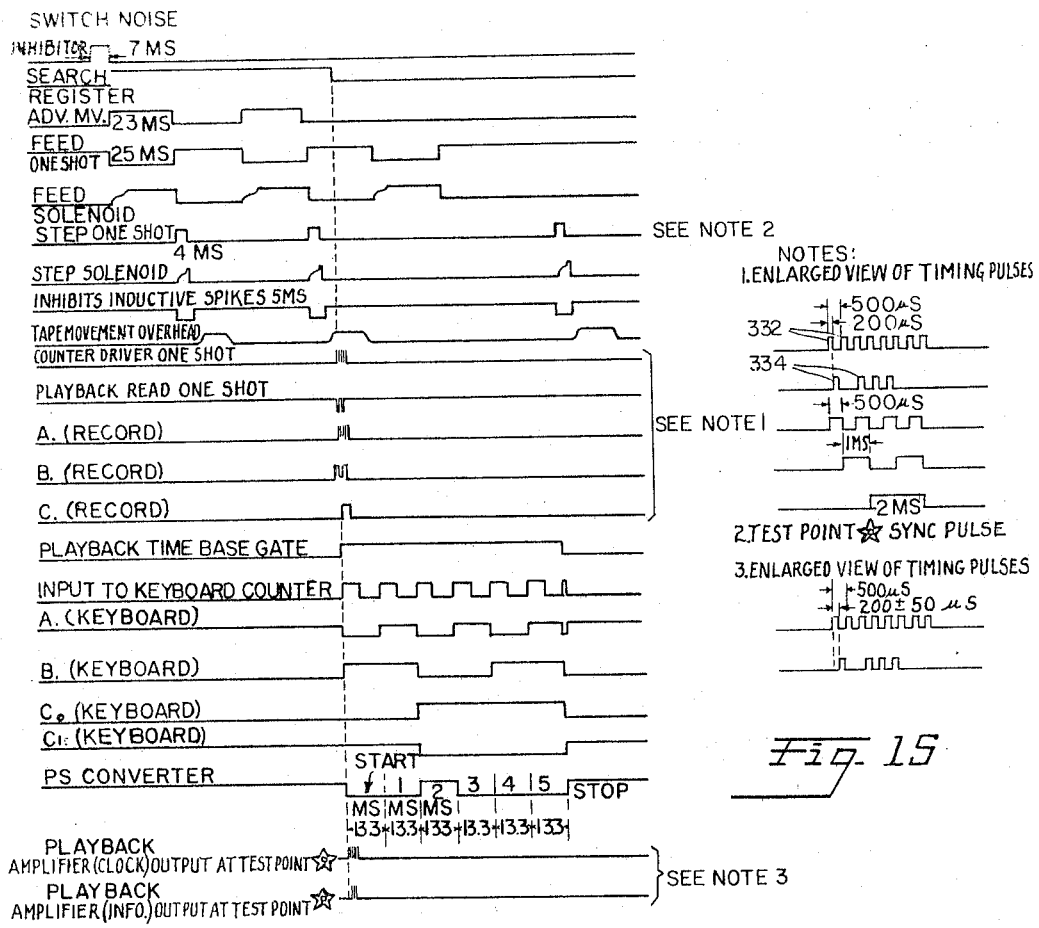
Figure 16:
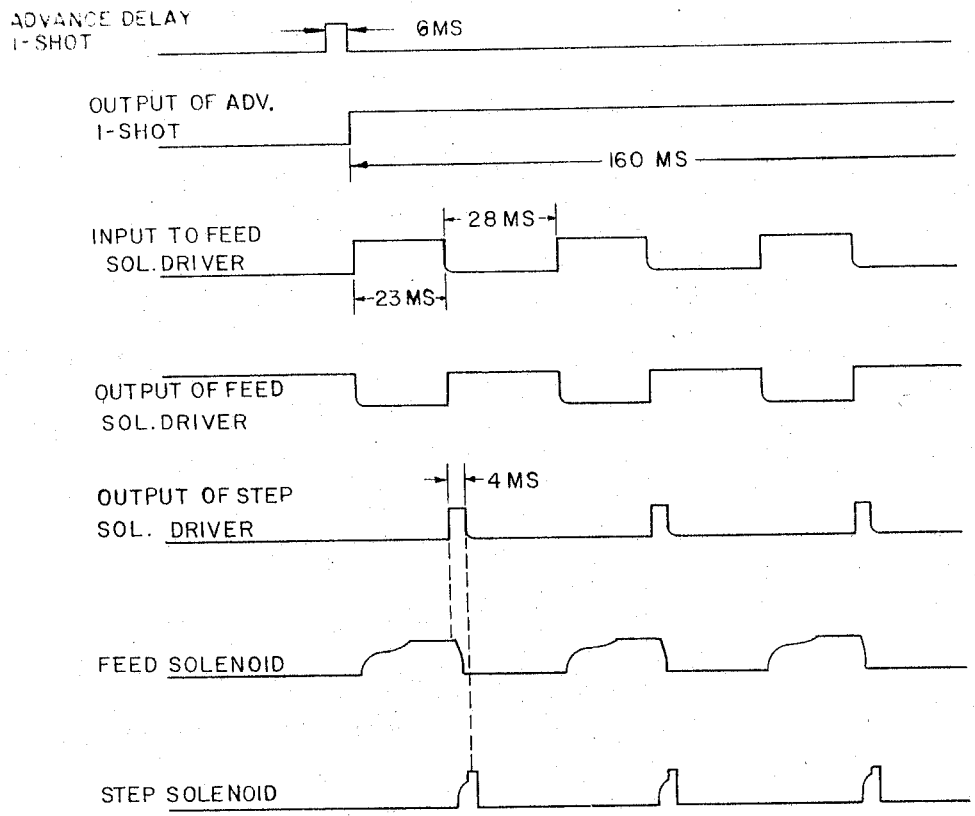
Figure 17:
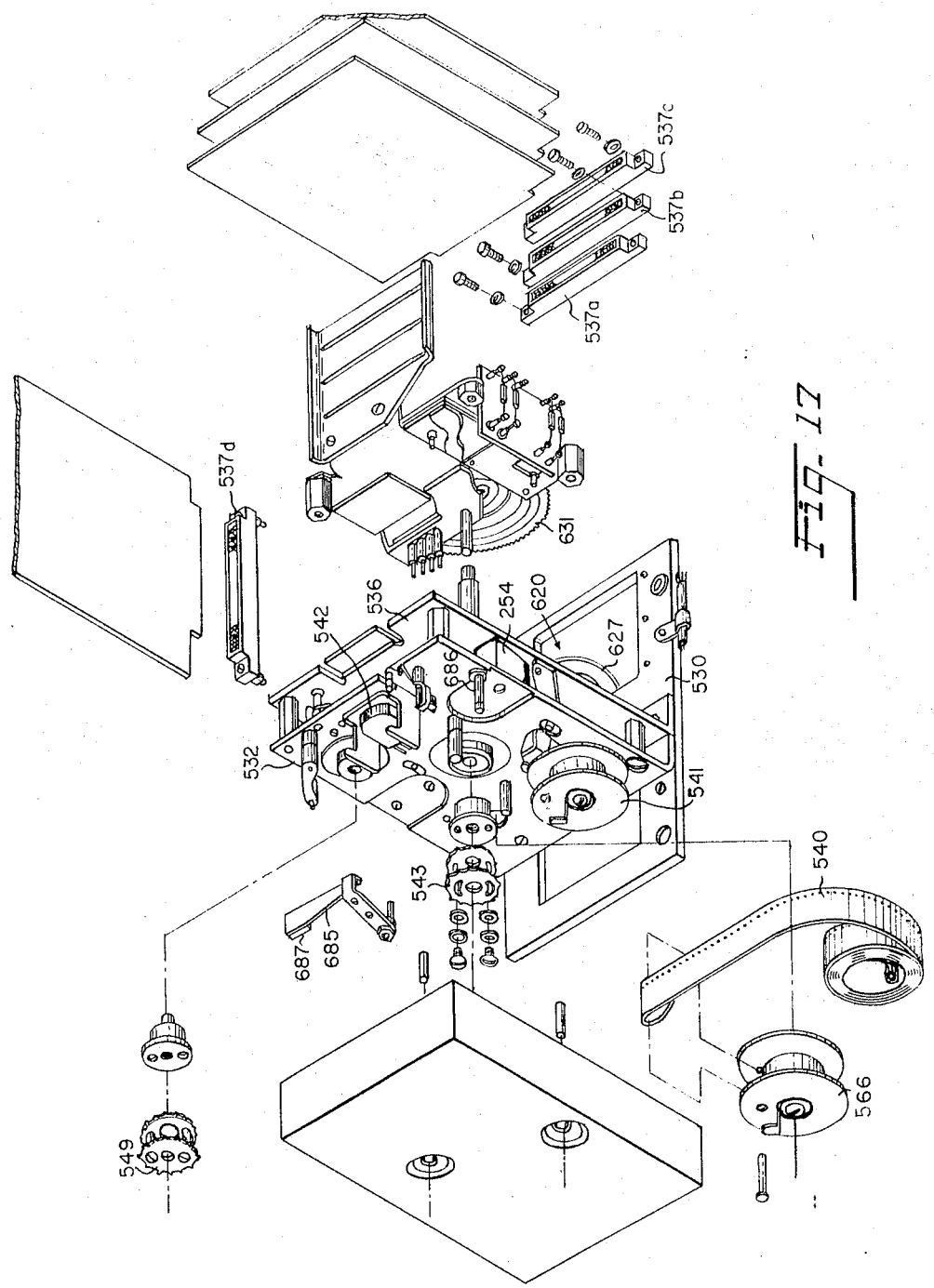
Figure 18:
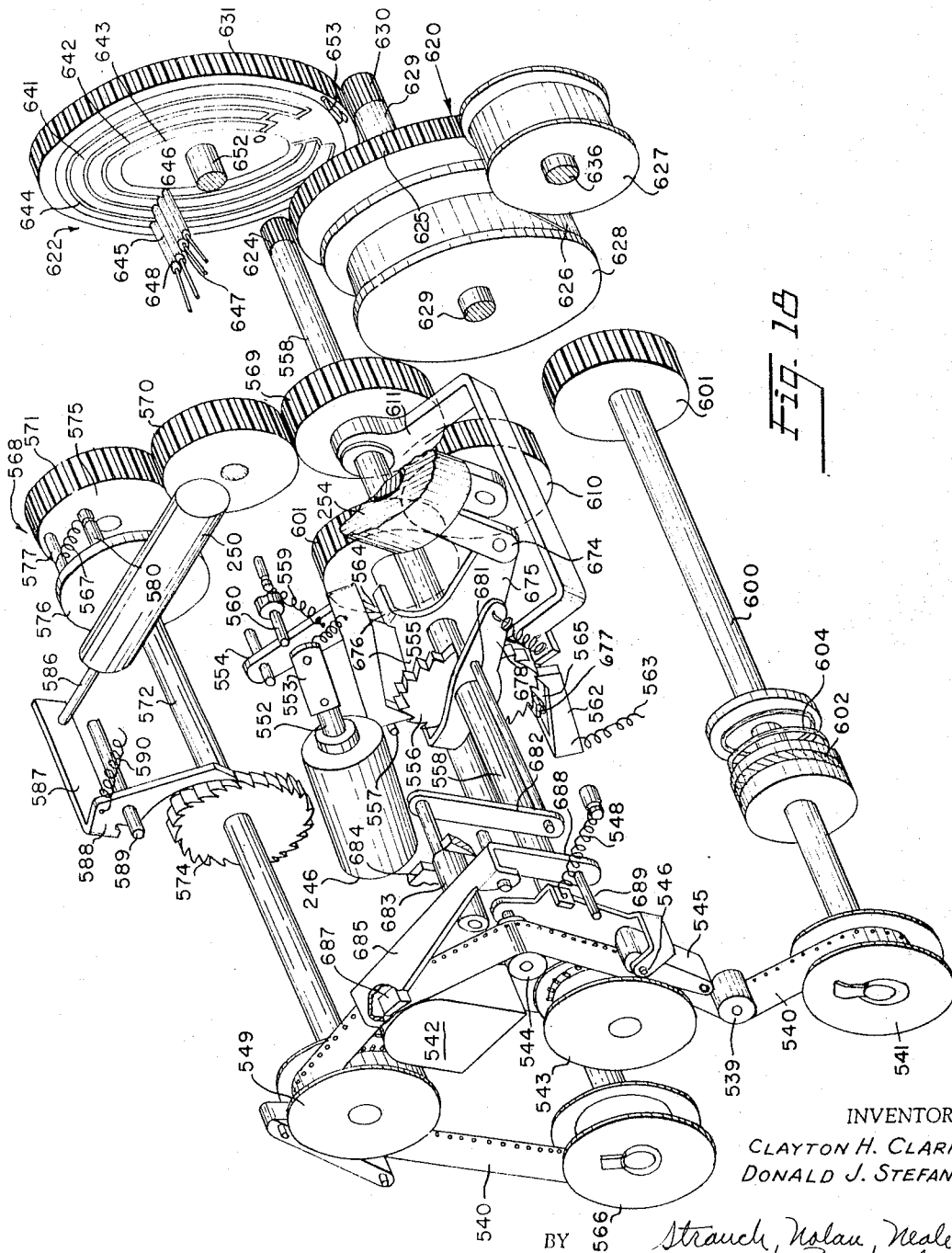
Figure 19:
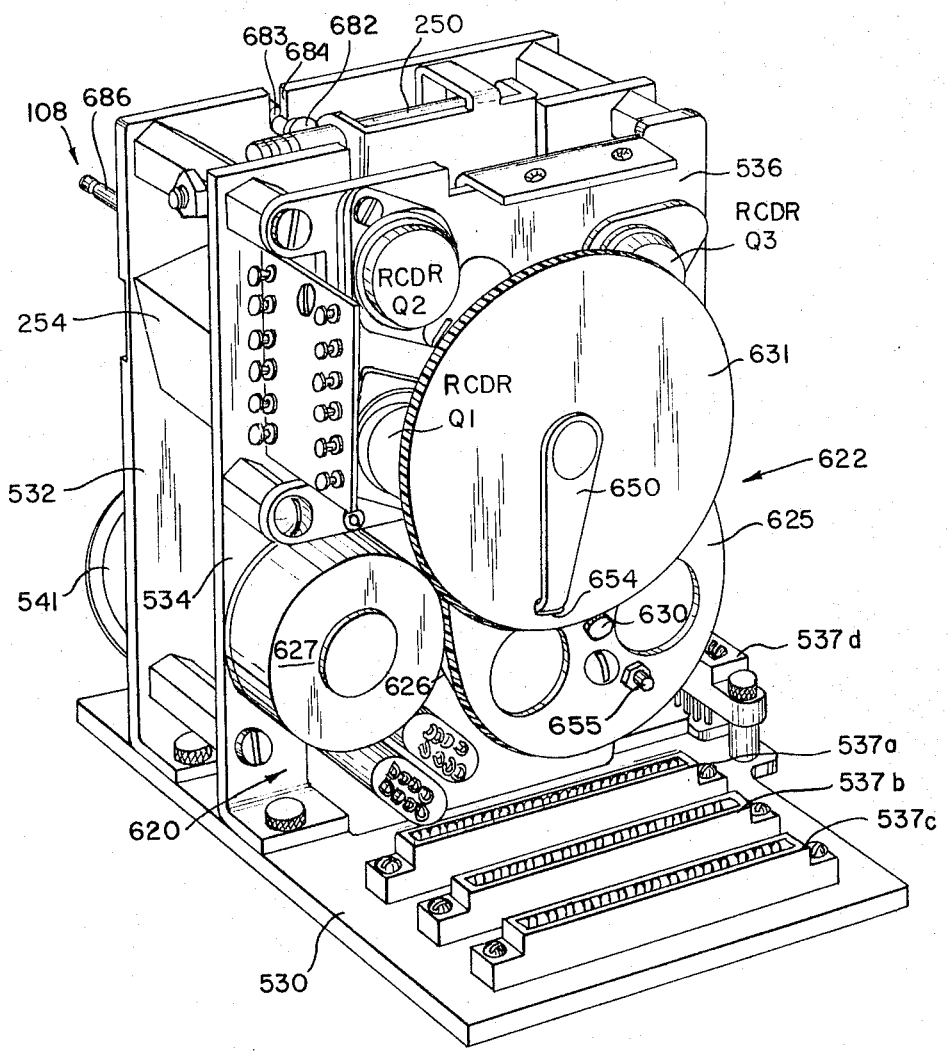

FIGURE 8 includes 14 separate blocks identified by the letters A through P, each illustrating a basic schematic circuit corresponding to a specific logic symbol and enabling convenient construction of the electronics represented by the following logic diagrams;

FIGURE 9 is shown on two sheets as FIGURES 9A and 9B and is a logic diagram for the keyboard unit;

FIGURE 10 is a timing diagram for the keyboard;

FIGURE 11 is shown on two sheets as FIGURES 11A and 11B and is a logic diagram for the magnetic tape recorder;

FIGURE 12 is a timing chart for the magnetic tape recorder recording operation, and FIGURE 13 is an expanded detail portion of some of the recording pulses shown in the more comprehensive chart of FIGURE 12;

FIGURE 14 is a timing chart for the recorder playback operation, and FIGURE 15 is an expanded detail portion of various timing pulses shown in FIGURE 14;

FIGURE 16 is a timing chart for the recorder operations during a rewind condition;

FIGURE 17 is a partially broken away and partially exploded perspective view of the magnetic tape recorder structure;

FIGURE 18 is a skeletonized perspective view illustrating all of the tape recorder drive trains, and includes the tape wheels, sprocket wheels, solenoids, negator spring and commutator gear;

FIGURE 19 is a rear perspective view of the recorder unit with the printed circuit boards removed;

FIGURE 20 is a detail view looking at the front of the recorder and illustrates the tape feed and stepping wheels and the path of the tape as it passes over the record and playback head;

FIGURE 21 is also a detail view looking from the front of the recorder but with the front plate substantially broken away to illustrate the stepping mechanism and the rewind mechanism, the rewind solenoid being shown in energized position;

FIGURE 22 is a further detail view of components just behind the front plate and can be better oriented by visualizing it as an overlay on FIGURE 21, showing the tape feeding solenoid and its linkage to the feed pawl seen in FIGURE 21;

FIGURE 23 is a vertical cross-section view illustrating the arrangement of the spring biased lost motion stepping mechanism for the tape stepping wheel;

FIGURE 24 is a section taken on line 24—24 of FIGURE 23;

FIGURE 25 is a vertical cross-section view illustrating the friction clutch and drive gear as used on each tape spool;

FIGURE 26 is a cross-section lay-out view of the negator spring and commutator assembly;

FIGURE 27 is a detailed view of the printed circuit on the commutator gear;

FIGURE 28 is an electrical detail schematic of the commutator circuit;

FIGURE 29 is an enlarged detail view of a segment of tape with a clock and character digital pulse pattern superimposed.

GENERAL

An over-all view of an exemplary teletypewriter set 100 which utilizes the present invention is shown in perspective in FIGURE 1 and diagrammatically in FIGURE 2.

The set is a send-receive teletypewriter set designed for keyboard sending and magnetic tape recorder sending, page copy monitoring and page copy receiving. Simultaneous sending and receiving is possible with a set, one call being received on one printer 102 of the set, a second call being received on the second printer 104 of the set, and a third call being sent from either the keyboard 106 or the tape recorder 108.

The set can operate at 60 or 100 w.p.m. in conjunction with three separate loops: two receive, and one send. A tone frequency of 1200 cycles is employed on the loops for neutral, start-stop, Baudot-code signaling. By suitable redesign the units of the set can accommodate other codes.

A complete teletypewriter set (FIGURE 1) consists of two units, Unit 1 and Unit 2. Unit 1 contains a printer 102, a keyboard unit 106, a magnetic tape recorder 108 and a power supply unit 110. As represented in FIGURE 2, the printer 102, recorder 108, and power supply unit 110 are mounted on a drawer which slides on tracks (not shown) into a two-piece cover 114. Unit 2 contains a printer 104 and a power supply unit 112 also mounted on a drawer identical to Unit 1 drawer 113 which slides into a cover assembly 114'. Manual control of the various operations of the set is maintained from the panels on the keyboard unit 106 of Unit 1.

The keyboard unit (see FIGURES 1 and 2) consists of a cover case 116, a typing mechanism (not shown), keyboard electronics, a mode selection panel 118, mode switches and relays K1–K9 (under the mode pushbuttons), a tape recorder monitor panel 120, a character counter 122, and a keyboard-locking mechanism. Functionally, the keyboard unit also includes two tuning fork oscillators 128 which are mounted in the power supply unit 110 and provide accurate time bases for a 60- or 100-w.p.m. sequential transmission by the keyboard.

A depressed typing key 130 causes the keyboard unit to generate both a 5-bit, parallel signal in Baudot code and a 7-bit, start-stop, serial signal in Baudot code.

A depressed mode pushbutton 132 causes the keyboard to switch various input-output connections of the set to desired operating modes and to light the applicable mode indicating lamp 134.

The REWIND pushbutton 136 on the record monitor panel 120 causes the keyboard unit to signal the tape recorder 108 to rewind its magnetic tape.

In response to signals from the recorder 108 the keyboard unit 106 indicates, by lighted ones of lamps 138, the position of the tape in the recorder.

As determined by the selected mode of operation, the keyboard unit 106, as part of Unit 1, is used (1) to send coded messages through a 1200 cycle tone generator 144 (see FIGURE 4) directly to the outgoing line (SEND KEYBD mode), (2) to store a message in the magnetic tape recorder 108 (STORE mode), and (3) to test the printers 102 and 104 (TEST 1 and TEST 2 modes).

The 32 typing keys are arranged in a mechanical keyboard 400 in three rows in teletypewriter order, although having typewriter spacing between keys. One to five glass-enclosed reed switch contacts 146 a, b, c, d and e (see FIGURE 9) (to be later fully described) close magnetically in response to the depression of any key to provide a parallel electrical encoding of the corresponding character. A sixth reed switch 148 (universal bar switch) closes for each key depression to supply a start signal to the associated keyboard electronic circuits. The feel of an electric typewriter keyboard is duplicated even though there is no mechanical linkage between typing mechanism and printer. Two-character typing bursts that exceed the line rate of 60 or 100 w.p.m. are permissible; the keyboard lock solenoid 123 and associated mechanism holding the second character in mechanical storage until the first character is transmitted electrically. A repeat key 150 (see FIGURE 3) permits repeated transmission of any character whose associated key 130 is held down at the same time.

The main function of the keyboard electronics (see logic diagram of FIGURE 9) is to convert parallel electrical signals generated by the typing mechanism or by the recorder into the serial electrical signals required by the outgoing line. The keyboard electronics are contained principally on two printed circuit boards mounted in the rear wall unit of the keyboard unit 106. Seven mode pushbuttons 132 and seven associated lamps 134 (see FIGURE 3) make up the mode selection panel 118 to the right of the typing keys. The pushbuttons allow the operator to select a mode of operation for either Unit 1 or Unit 2. Momentary operation of a pushbutton causes operation of an associated switch and electrical locking of one or more associated mode relays K1–K9 and also lights a corresponding lamp 134 (DS1–DS7) on the mode selection panel 118. With the pushbuttons, the operator can place the set in the following modes:

(1) IDLE—(RECEIVE): In the idle mode, the motors of both printers are off; the RECEIVE lamp DS5 is on; and the set is available for local use, for receiving from another station, or for both, simultaneously. Operation of the RECEIVE pushbutton places the set in the idle mode and discontinues all other modes except the RECEIVE mode. To set up an incoming call to this station, associated telegraph terminal group equipment (not part of this invention) operates a supervisory relay in Unit 1 or Unit 2 to turn on the associated printer motor and thus place the set in the RECEIVE mode.

(2) STORE: The STORE mode connects the parallel output of the keyboard unit 106 to the tape recorder 108 and the serial output of the same keyboard unit 106 to the printer 102. This allows the operator to store a message prior to sending it to the outgoing line and to monitor the storing process. Operation of the STORE pushbutton places the set in the STORE mode and lights the STORE lamp DS4. After typing the message to record it on the magnetic tape, the operator presses the REWIND pushbutton 136 on the recorder monitor panel 120. This action causes the tape recorder 108 to rewind and thus places the message on the tape in a position to be read and sent to the line.

(3) NO ADVANCE: The NO ADVANCE mode duplicates the STORE mode except that a blank area (used as a signal condition as will be fully described hereinafter) is not inserted on the magnetic tape just ahead of the recorded message. This mode is used after a STORE mode has been interrupted to allow receipt of an incoming message on the Unit 1 printer. A blank area cannot be permitted in a recorded message on the tape since the area is used by the recorder 108 to recognize the end of a message.

(4) SEND KEYBOARD: To set up a call to the outgoing line, the operator presses the SEND KEYBD pushbutton. This extends a D.C. supervisory ground from the connectinng equipment to a mode switching relay (which operates from and locks to the supervisory ground). The RECEIVE lamp DS5 turns off and the SEND KEYBD lamp DS1 turns on. In the SEND KEYBD mode, it is possible to receive on Unit 1 printer 102 or on Unit 2 printer 104 or on both printers simultaneously; the output of the keyboard does not appear on the Unit 1 printer 102 as it does during the STORE mode. All characters typed on the keyboard during this mode are sent to the outgoing line.

(5) SEND RECORD: To send from the recorder to the outgoing line during the SEND KEYBD mode, the operator presses the SEND RECORD pushbutton. This starts the tape recorder 108 which will send one tape recorded message and then stop automatically.

*The Unit 1 Power Supply* 110 (see FIGURE 5) converts 115-volt, 400-cycle, single-phase power into the D.C. voltages required by Unit 1. The output voltages are regulated to provide negative 33 volts for the driving transistor collectors and the associated solenoids that perform such machine functions as keyboard locking, printer spacing, and recorder tape advance; negative 20 volts for the one-shot and amplifier collectors that precede the driving transistors of the printer and recorder; negative 12 volts for the collectors of all other transistors; and positive 5 volts for the biasing of most transistors. Unregulated 28 volts also is provided for the switching relays, keyboard lamps, and printer copy lamps.

Power supply components such as the input transformer 160 filter capacitors C–1, C–2, C–3 and C–4, and resistors are mounted as a subcomponent 110 on the Unit 1 drawer behind the printer mechanism. Other components such as the power transistors and reference diodes which present heat dissipation problems as has been described are located on heat sinks (not shown) mounted in the outside rear of the printer cover.

The power supply chassis 162 on the printer drawer is a common connection point where cables from the external connectors and external power supply components, from the printer electronics, all plug into connectors which are wired together. The two keyboard tuning fork frequency standards also are mounted in the power supply.

The recorder package 108 (see FIGURE 17) consists of four printed circuit boards, a magnetic tape supply reel and associated take-up reel, a sprocket-drive mechanism, and a rewind mechanism. The sprocket-drive mechanism steps the tape forward in 1-character steps during record and playback. The rewind mechanism contains a powerful driving spring (termed a negator spring), which is wound up by the sprocket-drive mechanism during recording and playback. During rewind, the negator spring force is released to rewind the tape. The recorder stores information in digital serial form on magnetic tape.

In Unit 1, the tape recorder stores a message as it is typed on the keyboard unit 106. After a complete message is stored, the tape recorder 108 is used to send the message to the outgoing line at the line rate of 60 or 100 w.p.m. as determined by a switch on power supply unit 110. Between the recording and sending of a message, the tape must be rewound.

Components required to perform the recording and reproducing functions are contained in one compact package 108 located behind the printing mechanism 102 in Unit 1. *When sending to the outgoing line, the recorder uses the parallel-to-serial converter, tone generator, and tone keyer that are part of the keyboard electronics.*

Two tracks are recorded on 16-millimeter magnetic tape (see FIGURE 29). One track contains clocking (synchronizing) pulses and the other track contains the information pulses. For a given character, eight clocking pulses and one to five information pulses are recorded. Up to 3600 characters can be stored. Rewind of this exemplary 3600 character tape recorder, takes less than 10 seconds.

*Over-all functional description*

Figure 6B:
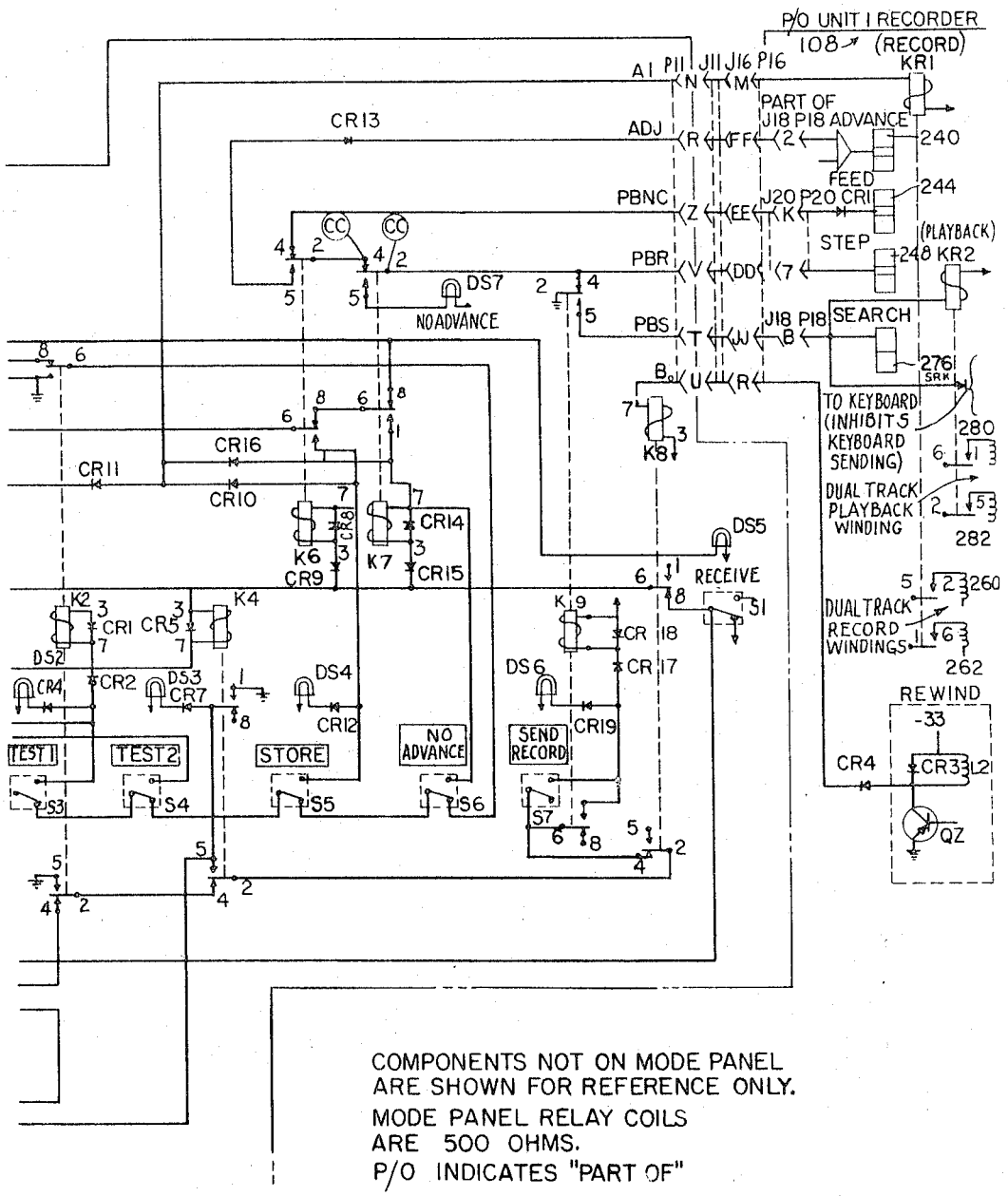
FIGURE 6 is shown on two sheets as FIGURES 6A and 6B and is a schematic illustrating the circuitry of the mode control panel on the keyboard unit and, for convenience, some components of correlated subassemblies in the teletypewriter set.

FIGURE 6 shows the various functional sections and associated external signaling lines of the exemplary teletypewriter set, FIGURE 5 shows the power supply circuit and FIGURES 6A and 6B viewed as a single figure show the mode panel control circuits.

As a general rule, final control of both incoming and outgoing transmission to and from the exemplary set will originate from associated telegraph terminal group equipment (not shown).

INCOMING MESSAGES: Referring primarily to FIGURES 6A and 6B, to seize Unit 1 and turn on the printer motor B1, associated terminal group equipment (not shown) provides ground potential to incoming line 1 (lower left corner of FIGURE 6A) on a simplex basis. Relays K1–1 and K3–1 operate over this supervisory path, in turn operating relay K2–1 to turn on the printer motor B–2. To seize Unit 2 and turn on its printer motor B–2, the associated equipment provides ground potential to incoming line 2. Relays K1–2 and K3–2 operate over this supervisory path, operating relay K2–2 to turn on driving motor B–2.

OUTGOING MESSAGES: Since outgoing transmission depends on the availability of remote switching equipment (not shown) the associated equipment (not shown) will of course determine when a call can be originated. To request use of the outgoing line, the local operator depresses the KEYBD SEND push button to operate switch S–2 to connect a mode relay K1 to the outgoing line. If the associated equipment is available, ground potential is applied to the outgoing line on a simplex basis, completing a circuit for the mode panel relay K1. Relay K1 locks to the supervisory ground signaling through its relay terminals 1 and 6 and lights the SEND KEYBD lamp DS–1 through relay terminals 2 and 5 to signal the operator that sending may start.

MESSAGE PREPARATION CONTROL: Control of the Unit 1 recorder 108 while storing a message is maintained from the Unit 1 keyboard 106 through mode push buttons REWIND, STORE, and NO ADVANCE.

REWIND: The REWIND pushbutton 136 (recorder control panel 120) triggers the Unit 1 recorder circuitry directly; that is, it does not provide control through the mode panel relays. However, during rewind, the recorder circuit operates a mode panel relay K8 to discontinue the STORE mode, as will be described later. Discontinuing the STORE mode during the rewind avoids loss of stored characters.

STORE: The STORE mode pushbutton, through switch S5, lights the STORE lamp DS4 and energizes relays K6 and K3 which (a) prepare the circuits of the recording head windings through recorder relay KR1, (b) keep the STORE lamp DS4 lighted, (c) lock under control of contacts 2 and 5 of the RECEIVE mode relay K1–1 so that the associated equipment can interrupt the STORE mode, and (d) as described under a following section entitled Recorder Logic, trigger the advance controller of the recorder circuitry through contacts 2 and 5 of relay K–6 to advance a small amount of tape over the recording head. This blank portion of tape will act as an end-of-message signal for the first of two messages stored successively. Further, the operated mode panel relays K6 and K3 (a) start the Unit 1 printer motor B1, and (b) connect the output of the keyboard through contacts 1 and 6 of relay K3 and contacts 6 and 8 of supervisory relay K3–1 to the input of the Unit 1 printer 102 so that the printer will monitor what is being stored.

NO ADVANCE: The NO ADVANCE mode pushbutton, through switch S6, lights the NO ADVANCE lamp DS7 and energizes mode panel relays K7 and K3 which (a) prepare the circuits of the recording head windings, (b) keep the NO ADVANCE lamp DS7 lighted, and (c) lock under control of the RECEIVE mode relay K1–1 so that the associated equipment can interrupt the NO ADVANCE mode (which is an auxiliary STORE condition). Note that the advance control of the recorder is by-passed in this mode and no blank tape is inserted ahead of the stored message. Further, the operated mode panel relays K7 and K3 (a) through contacts 2 and 5 of relay K3, start the Unit 1 printer motor B1, and (b) through contacts 1 and 6 of relay K3, connect the output of the keyboard 106 to the input of the Unit 1 printer 102 so that the printer 102 will monitor what is being stored in recorder 108.

SENDING CONTROL: Control of the keyboard 106 and recorder 108 during sending to the outgoing line is maintained from the mode panel pushbuttons 132 as soon as an outgoing line is made available by the associated equipment.

KEYBOARD: The keyboard 106 is always connected to the outgoing line. As soon as the SEND KEYBD lamp DS1 lights when the SEND KEYBD pushbutton switch S2 is operated, associated equipment is available to extend the call to the desired station and the operator may start typing.

RECORDER: When the called station is reached (as indicated by acknowledgment characters being printed by the Unit 1 printer 102), the recorder 108 is started by operation of the SEND RECORD pushbutton. This pushbutton operates switch S7 to energize mode panel relay K9 which (a) through its contacts 2 and 5 prepares the circuits of the recorder playback head windings 280 and 282, (b) lights the lamp DS6 beside the SEND RECORD pushbutton, (c) locks under control of the supervisory ground returned over the outgoing line from the associated equipment and through contacts 1 and 6 of SEND KEYBD relay K1, (d) triggers a searching operation by the recorder 108 by a ground through contacts 2 and 5 of relay K9, and (e) blocks the keyboard electrically through the same contacts 2 and 5 of relay K9 and associated keyboard circuitry so that the keys cannot supply a character even if operated by mistake. In searching, the recorder 108 advances the magnetic tape over the head but does not send to the outgoing line until a character is found on the tape.

INCOMING SIGNALING: The mark signal on either incoming line is a continuous 1200-cycle tone. The tone is removed to indicate a space signal. A tone detector included in the printer circuits responds to the 1200-cycle tone to keep a transistor on for mark and to turn it off for space.

OUTGOING SIGNALING: A 1200-cycle, free-running multivibrator supplies a mark tone on the outgoing line with the spacing pulses provided by turning off the multivibrator for a time controlled by a tuning fork oscillator frequency standard. The frequency standard drives a 3-stage counter, the output of which turns the multivibrator on and off in a series of marks and spaces determined by the Baudot code of the desired character. Characters are supplied either by depressing a keyboard typing key 130 or by causing the recorder 108 to move a character stored on magnetic tape past the recorder head playback windings 280 and 282.

*Mode circuit operation*

FIGURE 4 shows the mode panel and its associated circuits in schematic form. The following theory explanation shows how the relays of the mode panel switch the various internal and external connections of the teletypewriter set under control of both the associated equipment (not shown) and the local operator.

IDLE CONDITION: With no incoming or outgoing traffic, all mode panel relays K1 through K9 are released, and the two supervisory relays K1–1 and K1–2 for printer 102 are released. Motor B2 control relays K2–1 and K2–2 are also released and the printer driving motors B1 and B2 are off. Further, incoming line relays K3–1 and K3–2 are released. The RECEIVE lamp DS5 is lighted during the idle condition through the following circuit: negative 28 volts through lamp DS5, contacts 8 and 6 of relay K7, contacts 8 and 6 of relay K6, contacts 8 and 6 of relay K5, contacts 8 and 6 of relay K2, normally closed contacts of the NO ADVANCE STORE, TEST 2 and TEST 1 switches, pin W of P11–J11, pin J of P7–J7, contacts 5 and 2 of relay K1–1, pin K of J7–P7, pin d of J11–P11, contacts 4 and 2 of relay K1, to ground.

RECEIVE CONDITION: The associated equipment provides ground potential to incoming line 1 or 2 to signal the corresponding Unit 1 or Unit 2 printer to receive. This simplex ground signaling operates relay K1–1 or K1–2. Hence, if Unit 1 is to receive, line 1 is grounded and the following events occur. Battery-connected relay K1–1 operates, and switches the operating circuit for RECEIVE lamp DS5 through contacts 2 and 4 so that now only relay K1 controls the RECEIVE lamp. The RECEIVE lamp remains on as a signal that a message will be sent to the set. Relay K1–1 energizes relays K2–1 and K3–1 from ground through its contacts 6 and 1. Diode CR11, in the operating path of relay K3–1, will allow current to flow from contacts 6 and 1 of relay K1–1 to the coil of relay K2–1, but will block current flow in the opposite direction when relay K2–1 is operated by mode panel relay K3. Relay K2–1 then turns on the printer motor of Unit 1. Relay K3–1 then connects the incoming signal line to the printer electronics through its contacts 6 and 1, and disconnects the keyboard output circuit from the printer electronics. During the STORE mode (as will be explained hereinafter) relay K3–1 is released to disconnect the incoming signal line from the printer while the keyboard is sending. The mark tone on the incoming line would otherwise prevent the printer from monitoring what is being sent by the keyboard. At the end of the message, the associated equipment removes ground potential from incoming line 1. Relays K1–1, K2–1, and K3–1 release, the printer motor B1 of Unit 1 turns off, and the RECEIVE lamp DS5 remains lighted.

If Unit 2 is to receive, line 2 is grounded and the following events occur. Relay K1–2 operates and operates relays K2–2 and K3–2 through contacts 6 and 1. Further, relay K1–2 opens a possible circuit through contacts 2 and 5 to relay K5 to release relay K5 during the TEST 2 mode. This feature allows the associated equipment to stop the TEST 2 mode at any time. Similarly, relay K1–1 opens a possible circuit through contacts 2 and 5 to relay K2 to stop the TEST 1 mode at any time. Relay K2–2 turns on the printer motor B2 of Unit 2. Relay K3–2 connects incoming line 2 through contacts 8 and 6 to the printer electronics of Unit 2. With only Unit 2 receiving, the RECEIVE lamp DS5 remains lighted but under control of mode relays K1, K2, K5, K6 and K7. This feature emphasizes the receive-only nature of Unit 2 (since the RECEIVE lamp indicates that Unit 2 is receiving only when another mode, STORE, for example, is not occurring at the same time). At the end of a message to Unit 2, relays K2–1, K2–2, and K3–3 release, the printer motor B2 of Unit 2 turns off, and the RECEIVE lamp DS5 remains lighted.

STORE: To store a message in the recorder before sending to the outgoing line, the operator depresses and holds the REWIND pushbutton until the green start-of-tape lamp lights momentarily. Operation of the STORE pushbutton now completes a circuit for relay K6 as follows: negative 28 volts through RECEIVE switch S1, contacts 8 and 6 of relay K8, blocking diode CR9, coil of relay K6, operated contacts of STORE switch S5, non-operated contacts of switches S4 and S3, pin W of P11–J11, pin J of P7–J7, contacts 5 and 2 of relay K1–1, pin K of J7–P7, pin d of J11–P11, contacts 4 and 2 of relay K1, to ground. Relay K6 operates and turns off the RECEIVE lamp DS5 through contacts 8 and 6; locks itself to the same operating ground that was used by the RECEIVE lamp through contacts 6 and 1; and extends ground to the recorder to trigger the advance one-shot through contacts 2 and 5. The STORE lamp DS4 lights from the same circuit that holds relay K6 operated. The recorder advances the tape a set amount to assure that any variation in the commutator contacts that light the start-of-tape lamp will not prevent recording from starting on a usable portion of the tape.

The same circuit that operates relay K6 also operates relay K3 as follows, starting from ground already traced to terminal 7 of relay K6: diode CR10, diode CR11, coil of relay K3, contacts 6 and 8 of relay K8, normally-closed contacts of the RECEIVE switch S1, to negative 28 volts. Operated, relay K3 at contacts 1 and 6 completes a circuit from the keyboard output to the printer 102 input as follows: keyboard connectors P14–J14 pin S, connectors J7–P7 pin S, mode panel connectors J11–P11 pin C, contacts 6 and 1 of relay K3, connectors P11–J11 pin A, connectors P7–J7 pin A, contacts 8 and 6 of relay K3–1, to the printer 102 electronics. This path allows the information being stored in the recorder to appear also on the printer 102 of Unit 1. Mode panel relay K3 operates power supply relay K2–1 through contacts 5 and 2 which supplies power to the motor B1 of printer 102. The same operating circuit used for relay K6 also operates the magnetic tape recorder relay KR1 via diode CR10. Recorder relay KR1 prepares circuits to the record head windings 260 and 262.

To interrupt the STORE mode for an incoming message, the associated equipment places ground potential on incoming line 1. Relay K1–1 operates; lights the RECEIVE lamp DS5 through contacts 2 and 5; turns off the STORE lamp DS4; and releases recorder relay KR1. Relay K1–1 holds relay K2–1 operated through contacts 6 and 1 to keep the motor running, and operates relay K3–1 to connect incoming line 1 to the printer tone detector.

NO ADVANCE: To continue storing a message in the recorder after an interruption to allow an incoming message to be received, the operator depresses the NO ADVANCE pushbutton. Operated, the NO ADVANCE switch S6 completes a circuit to relay K7 from the same ground that the STORE switch S5 extended to relay K6, as has been explained hereinbefore. Relay K7 operates, lights the NO ADVANCE lamp DS7 through contacts 2 and 5, turns off the RECEIVE lamp DS5 through contacts 8 and 6, and at contacts 6 and 1 locks to the original operating ground from relay K1 contacts 4 and 2. Note that the advance one-shot 240 in the recorder electronics is not triggered as occurred in the previously described STORE mode. Relay K3 operates as in the STORE mode to turn on the Unit 1 printer motor B1 and to connect the keyboard output to the printer 102.

REWIND AFTER STORE OR NO ADVANCE: After a message is stored, the operator depresses the REWIND pushbutton. Mode panel relay K8 operates through recorder transistor Q2 which is turned on by the operated pushbutton switch. Relay K8 at contacts 8 and 6 releases relay K6 (STORE mode) or K7 (NO ADVANCE mode), and also releases relay K3. When rewind is completed, recorder transistor Q2 (see portion of recorder electronics, lower right of FIGURE 9B) is turned off and relay K8 releases.

SEND KEYBD: Before sending to the outgoing line, the operator depresses the SEND KEYBD pushbutton. If the associated equipment is ready to assign a link to this station, ground potential is placed on the outgoing line. Switch S2 extends this ground to relay K1. Relay K1 locks to the ground on the outgoing line through contacts 7 and 6, lights the SEND KEYBD lamy DS1 through contacts 2 and 5, and turns off the RECEIVE lamp DS5 through contacts 2 and 4. With the SEND KEYBD lamp DS1 on, the operator types the called station's call letters and then depresses the RECEIVE pushbutton. Relay K1 releases because the operated RECEIVE switch S1 opens its circuit. Relay K1 disconnects negative 28 volts from the outgoing line through contacts 7 and 6 as a signal that the call letters have been sent. When the connection is established to the called station, a go-ahead signal is sent by the associated equipment to the printer of Unit 1. The operator now depresses the SEND KEYBD pushbutton again and types the message or starts the recorder. The SEND KEYBD switch S2 extends ground potential to relay K1. Relay K1 operates, locks to the outgoing line as before, and lights the SEND KEYBD lamp DS1.

SEND RECORD: After receiving a go-ahead signal, in the manner above described, the operator depresses the SEND KEYBD pushbutton to seize the outgoing line. If the recorder is to send the message, the operator next depresses the SEND RECORD pushbutton. Switch S7 extends ground from relay K1 contacts 2 and 5 to relay K9 and to the SEND RECORD lamp DS6. Operated, relay K9 locks through contacts 1 and 6, and triggers the recorder search register 276 through contacts 2 and 5 to allow the tape to be searched for the first character of the mesage. Relay K9 also operates recorder relay KR2 through contacts 2 and 5 to provide circuits for the recorder head playback windings 280, 282. Further, relay K9 provides an inhibit level to the keyboard through contacts 2 and 5 to prevent keyboard sending even though a key is depressed by mistake. When the recorder reaches the end of the stored message, the blank tape that follows the message will stop the tape movement. The operator on noting the end of the message on the printer 102 of Unit 1, or on noting that the sound of recorder operation has ceased, can depress the REWIND OR RECEIVE pushbutton.

If the REWIND pushbutton is depressed, relay K8 operates through the circuit previously described, and releases relay K9 and turns off the SEND RECORD lamp DS6.

If the RECEIVE pushbutton is depressed instead of the REWIND pushbutton, relay K1 releases, releasing relay K9 through contacts 6 and 7, and turning off the SEND KEYBD lamp DS1 through contacts 2 and 5.

*Keyboard and recorder block diagram functional description*

FIGURE 7 shows the functional sections of Unit 1, with the circuits of major elements represented by blocks. The immediate following description is divided into three parts: first, the general circuit functioning of the printer 102; second, the general circuit functioning of the keyboard unit 106; third, the general circuit functioning of the tape recorder 108. Following this description, a more detailed description of each major component, printer, keyboard and tape recorder, will be given with reference to logic diagrams.

AUTOMATIC CARRIAGE RETURN AND LINE FEED: If an incoming message lacks a carriage return at the end of any line, the printer mechanism, through a switch 206, operated by the print hammer carriage reaching end-of-line position as will be hereinafter described, guards against overprinting by automatically returning the carriage and accomplishing a line feeding operation. The switch contacts of switch 206 close to initiate this action when the carriage is stepped from position 71 to 72. If the character for position 72 is not a carriage return, the carriage return and line-feed one-shots 302 and 304 are triggered as soon as the character is printed.

KEYBOARD UNIT CIRCUIT FUNCTIONING: The block diagram description below expands on the general description of the keyboard as has been presented hereinbefore. The mechanical keyboard structure will be fully described in a later section.

TYPING KEYS: A depressed typing key 130 or space bar 460 triggers the following operations:

(1) Contacts of a U bar reed switch 148 close and set a counter input gate register 210.

(2) Contacts of a pulse-per-character switch 212 close and trigger a character counter one-shot 214 energizing a counter stepping solenoid 216. The pulse-per-character switch 212 close each time a character key button is depressed to cause the receiving printer 102 to either print and space or just to space. When closed, the switch 212 triggers the character counter one-shot 214 to energize the counter solenoid 216 long enough to advance the character counter 122 one index step.

(3) The contacts of one to five reed code switches 146a–146e close, depending on the Baudot code of the typed character. The ground levels provided by these switches 146 set a parallel register group 218 after a 7 to 10 millisecond time delay. This delay is provided by a read delay one-shot 220 and guarantees that the reed contacts code switches 146 will stop vibrating *before* the indicated character is gated into the parallel register group 218.

COUNTER INPUT GATE 210 is set by each typed character. In being set, the register 210 (a) triggers the read delay one-shot 220, (b) sets a keyboard lock register 222, and provides a level that will allow an output pulse from a 3-stage divider 224 to step a 3-stage counter 226. After countdown is completed by the counter 226, it resets the counter input gate 210 via flip-flop register 228 called a "counter input gate reset."

KEYBOARD LOCK MECHANISM 123: The code bails of the keyboard, as will be described hereinafter, are locked momentarily each time a depressed typing key moves them to encode the corresponding character. The keyboard lock register 222, set by the counter input gate 210, operates a lock solenoid 230 to perform a mechanical locking operation. When two characters are typed in rapid succession, such that the line rate is exceeded, the first character is transmitted and the second character will be held locked in mechanical storage in the keyboard 106 until the first character is completely transmitted electrically. In addition to effecting mechanical storage, the lock mechanism 123, by preventing movement of the code bails, also prevents depression of any other typing key.

When the recorder 108 is sending and at other times when it is necessary to prevent use of the keyboard, inhibition of the keyboard is not accomplished by the lock mechanism 123. Rather, input from the U bar reed switch 148 to the counter input gate 210 is inhibited electrically as will be hereinafter more fully described.

READ DELAY ONE-SHOT 220 is triggered by the counter input gate 210. After the 7- to 10-millisecond delay designed into the circuit, the one-shot 220 gates the output of the code switches 146 into the parallel register group 218.

FREQUENCY STANDARD 232: Two are used, one for 60 w.p.m. and one for 100 w.p.m., and whichever standard is used, a tuning fork oscillator located in the power supply unit 110 provides pulses continuously at a rate that does not vary more than ±.01 percent. The output frequency of the selected frequency standard 232 is divided down by the 3-stage divider 224 so that every eighth pulse from the standard steps the 3-stage counter 226. A character stored in the parallel register group 218 by a depressed keyboard key, or alternatively by the tape recorder 108, is gated sequentially into a 1200-cycle astable multivibrator 234 by the 3-stage counter 226. This free-running multivibrator 234 supplies the 1200-cycle tone used for signaling on the outgoing line and is turned on and off by the 3-stage counter 226 via a set of parallel-to-serial gates 227.

When sending is initiated by a depressed typing key, the counter 226 is started by the counter input gate 210. At the end of countdown, the counter 226 resets the counter input gate 210 via the counter input gate reset register 228.

When sending is initiated by the magnetic tape recorder 108, the counter 226 is started by a playback time base gate 236. At the start of countdown, the counter 226 signals the recorder (via $A_0B_1C_0$) to move the magnetic tape one character step.

RECORDER CIRCUIT FUNCTIONING: The block diagram description below expands on the general description of the recorder presented hereinbefore. The recorder mechanical construction will be described hereinafter in a later section.

REWIND: Depression of the REWIND pushbutton 136 on the recorder control panel 120 (see FIGURE 1), closes rewind switch RSW and results in (a) automatic feeding and stepping of the tape forward three steps to provide a blank stopping area after the recorded message, (b) disengagement of the feeding and stepping mechanisms and driving the tape backwards until it is completely rewound, and (c) automatic feeding and stepping of the tape forward slightly to reach a reliable portion of the tape where storing can start. The REWIND switch RSW on the keyboard triggers an advance one-shot 240 which provides a positive output level for a sufficient time to cover three feed and step operations of the recorder. The positive level starts an advance multivibrator 242 which cycles three times before being shut off. The three output pulses trigger a feed one-shot 244 three times. Each time the feed one-shot is triggered, it energizes a recorder feed solenoid 246 for about 25 ms., sufficient time to feed the tape once in the forward direction toward the recorder head as will be hereinafter described.

When the feed one-shot 244 flops back into its normal state, it provides a positive pulse that triggers a step one-shot 248. The step one-shot energizes a step solenoid 250 for about 4 ms., sufficient time to permit an indexed stepping pull of the tape over the recorder head.

After the tape is fed and stepped three times, the advance one-shot 240 flips back to its normal state, providing a positive pulse to reset a rewind register 252. A transistor in the rewind register turns on and energizes a rewind solenoid 254 which disengages the feed and step mechanisms and allows a negator spring (to be hereinafter described) previously wound up by the feed mechanism to drive the tape back onto its supply spool. When the tape is completely rewound, a commutator (see FIGURE 27) on the negator mechanism closes a pair of contacts constituting a start-of-tape switch 256. These closed contacts 256 set the rewind register 252 to de-energize rewind solenoid 254 and stop the rewind operation, light the green start-of-tape lamp 141 on the keyboard panel, and turn on the advance multibrator 242 again. Feeding and stepping start again under control of the advance multivibrator 242 and continue for three or four steps until the commutator opens the start-of-tape contacts 256. The operator on hearing the rewind and subsequent step operations finish, can now store a new message or send a previously stored message.

STORE: Depressing the STORE mode pushbutton closes its switch S5 (see FIGURE 6B) and energizes relays K3 and K6 which provides an automatic advance feeding and stepping of the magnetic tape for three steps. Depression of any typing key on the keyboard next starts the keyboard sending circuitry including the keyboard 3-stage counter 226. A key initiated character stored in the parallel register group 218 is gated onto the recorder tape as follows: As the 3-stage keyboard counter 226 begins to step under control of the frequency standard 232, it triggers a recorder tape feed one-shot 244 via previously described counter output leads $A_0B_1C_0$. This starts the feeding and stepping actions that will move the tape across the record windings 260 and 262 and thus allow clocking and information bits to be digitally recorded in two serial tracks on the tape. The feed one-shot 244, after causing the feeding action, triggers the step one-shot 248 and starts a high-speed multivibrator 264. Pulses from this free-running multivibrator now step a high-speed recorder counter 266 and triggers a clock delay 268.

While the tape moves across the record head cores of windings 260 and 262, the clock delay 268 energizes the record head clock winding 260 eight times, thereby recording eight clock or synchronizing pulses in serial order on one track of the tape (see FIGURE 29). After energizing the record head clock winding 260 by the first pulse of the eight serial pulses, the clock delay 268 triggers a character delay 270 which energizes the record head character winding 262, if a space has been registered as the first code element of the registered character. The high-speed counter 266 gates this first bit out of the keyboard electronics into the recorder electronics and allows triggering of the character delay 270 only if the bit is a space. The next four clock delay output pulses also trigger the character delay 270 if code elements 2, 3, 4, and 5 are spaces. The last three clock pulses placed on the tape are not used. The first five clock pulses will be used during playback to trigger the stored character information from the tape back into the keyboard for sending to the line.

SEND RECORD: Depression of the SEND RECORD mode pushbutton closes its switch S-7 (see FIGURE 6B) and, when in the SEND KEYBD or TEST 1 mode, energizes relay K9 and starts a search of the tape for the first recorded character. During searching, tape feed is controlled by the advance multivibrator 242 which is allowed to run by the search register 276. Tape stepping is controlled by the feed one-shot 244. When the first recorded clock pulse causes a current to flow in the recorder head playback clock winding 280, a counter control 284 is triggered and starts the following operations:

For the first detected clock pulse, the counter control 284 (1) steps the high-speed recorder counter 266 once, (2) resets the search register 276 to switch control of automatic feeding and stepping operations from the advance multivibrator 242 to the 3-stage counter 226 in the keyboard unit electronics, and (3) sets the playback time base gate 236 in the keyboard unit to allow the 3-stage counter 226 there to start. The recorder high-speed counter 266 is much faster than the 3-stage counter 226 in the keyboard unit. Therefore, the five bits of the recorded character read by the recorder head playback character winding 282 trigger a read control 286 to coordinate with the high speed counter 266 and pass only the recorded signal bits into recorder serial to parallel gates 288 and back in to the keyboard electronics through the keyboard unit parallel register group 218, while the 3-stage counter 226 is only gating a start pulse onto the outgoing line. Once a character from the recorder is registered in the keyboard electronics, the recorder tape feeding operation can be started in preparation for the next character to be read. The same $A_0B_1C_0$ levels used to feed the tape during a recording operation are also used during the playback operation. Stepping is triggered near the end of the slow keyboard count by the $C_1$ level of the 3-stage counter 226.

So long as characters continue to appear on the tape, the feeding and stepping operations will continue. Lack of a character, and therefore of a clock pulse, prevents further feeding.

*Basic circuits and logic symbols*

FIGURE 8 shows the basic circuits and corresponding logic symbols used in the teletypewriter set logic diagrams of FIGURES 9 and 11. This section includes a description of each basic circuit and the corresponding logic symbol, and the immediately following sections explain the switching logic of the printer, keyboard, and recorder as shown on related logic and timing diagrams.

Positive-going transitions are used to transfer information from one transistor stage to another. Logic 1 is defined as zero or ground potential; logic 0 is defined as negative or minus 12 volts potential. Therefore, a positive-going transition is a rapid change from logic 0 to logic 1. This change is available at the collector of a transistor as it is driven from the off state to saturation. In the transistorized circuitry of this invention, a positive transition (that is, positive pulse) will turn off a transistor to set or reset a register or to trigger a one-shot.

The logic symbols shown on FIGURE 8 provide both a logic and a block diagram representation of the circuit shown at the left of the symbol. Input and output leads are designated A, T, Q, etc. on both the circuit and logic symbol to allow exact interpretation. The following points must be understood: (1) If a stage inverts the input signal, the output lead leaves the symbol in a vertical direction as shown in FIGURE 8, blocks A, B and H. (2) The basic logic symbol for flip-flop stages shows the set state. The upper square of the symbol is always marked 1; the input lead is the setting input; the output lead is the collector of the transistor that is turned on and that, therefore, goes to logic 1 as the stage is set. Similarly, the lower square of the symbol is always marked 0; the input lead is the reset input; the output lead is the collector of the transistor that is turned off by the setting pulse and that, therefore, goes to logic 0 as the stage is set. (3) An inhibiting input is marked with a circle as shown in FIGURE 8, block E, lead I.

INVERTER: FIGURE 8, block A shows an inverter or amplifier. The same symbol enlarged with the letters HP (high power) is used on FIGURES 9 and 11 for driver stages that energize solenoids. Transistor Q1 is normally on due to the forward bias $-12$ volts which is sufficient to override the reverse bias of the $+5$ volts. A logic 0 on lead A will not change the state of the circuit; therefore, the output on lead T is logic 1. A logic 1 on lead A will block the $-12$ volt forward bias and allow the $+5$-volt reverse bias to turn off transistor Q1. With transistor Q1 turned off, a logic 0 is present on output lead T.

PEDESTAL GATE: FIGURE 8, block B shows a pedestal gate, so named because a positive level on input lead A raises the voltage swing used to trigger via input lead B to the point where it can turn off a transistor. Pedestal gates are used extensively since they are so flexible. For example, a triggering pulse can be blocked by having a negative level rather than a positive level on the A input lead. Further, information available as a level can be stored on the gate, to be used at a later time when the triggering pulse is supplied. The diode in the output of a pedestal gate blocks the negative pulse that is inherent in the differentiating action of the circuit. Pedestal gates that are primarily differentiating networks have the A input resistor always at ground potential and are so shown on the printer, keyboard, and recorder logic diagrams.

DELAY: FIGURE 8, block C shows the circuit and associated logic symbol used to provide a short delay. Longer delays are provided by one-shots as described below for block L. Transistor Q1 is biased on by the $-12$ volts present at its base through resistor R1. A positive pulse on lead A turns off transistor Q1. Transistor Q1 remains off until capacitor C1 discharges through resistor R1. The length of the delay is determined by the value of resistor R1 and capacitor C1.

SINGLE DIODE GATE: FIGURE 8, block D shows a diode gate that has only one input. The function of the gate is to pass only positive pulses and to block negative pulses.

OR GATE: The truth table in FIGURE 8, block F shows that the output of an OR gate is logic 1 (positive) when any one input is logic 1. With all of the inputs at logic 0 (negative), the output is also at logic 0. A change of any one input to logic 1 provides a positive triggering pulse. These gates provide a logic 0 level that allows a triggering pulse to set a corresponding one-shot. NOR GATE: FIGURE 8, block G shows a NOR (not OR) gate that is the same as an OR gate except that the output of the OR portion is fed through a transistor to invert the output.

OR GATE WITH INHIBITOR: FIGURE 8, block E shows an OR gate with an inhibiting input. With logic 1 applied by the inhibitor, it is impossible to produce an output transition from 0 to 1 since the output is always at 1.

AND GATE: The truth table in FIGURE 8, block J shows that the output of an AND gate is logic 1 only when all inputs are logic 1.

NAND GATE: FIGURE 8, block H shows a NAND (not AND) gate that is the same as an AND gate except that the output of the AND portion is fed through a transistor to invert the output.

REGISTER: FIGURE 8, block K shows a flip-flop register that is used as a temporary storage component. When voltage is initially applied to the circuit, one of the transistors conducts first due to circuit value imbalance. Assuming transistor Q1 turns on, its collector approaches ground. The current from +5 volts through resistor R4, resistor R2, and the collector-emitter junction of Q1 places a level of approximately +2 volts at the base of transistor Q2, insuring its cut-off. A positive pulse applied to lead S is passed by diode CR1 and turns off transistor Q1. The collector of Q1 goes to −12 volts which is present through the cross-coupling resistor R2 to the base of transistor Q2, causing transistor Q2 to turn on. When transistor Q2 turns on, its collector approaches ground. The current from +5 volts through resistor R3, resistor R5, and collector-emitter junction of transistor Q2 places a level of approximately +2 volts at the base of transistor Q1, reverse biasing it. A positive pulse at point R will pass through diode CR2 and turn off transistor Q2. This will flip the circuit back to its original condition. Alternate pulses at point S and point R will flip the circuit back and forth.

ONE-SHOT: FIGURE 8, block L shows a one-shot that is used as an accurate timing device. When voltage is initially applied to the circuit, transistor Q1 is on due to the forward bias provided through resistor R4, and transistor Q2 is off due to the reverse bias provided through resistor R5. With transistor Q1 on, capacitor C1 charges from −20 volts to ground through resistor R6, resistor R3, and the base-emitter junction of transistor $\overline{Q1}$. When capacitor C1 is fully charged, it has no effect on the state of the circuit as long as transistor Q1 is on. When a positive pulse comes in at point A it is passed by diode CR1 and turns off transistor Q1 provided the pulse has enough amplitude to override the −0.35-volt level present at the base.

When transistor Q1 goes off, its collector goes to approximately −19 volts. This potential is coupled to the base of transistor Q2 through the cross-coupling resistor R2, causing transistor Q2 to come on. Lead $\overline{Q1}$ goes to the base of a solenoid driver transistor. Transistor Q2 conducts through the base-emitter junction of the driver transistor to ground. With transistor Q2 on, the negative potential at its collector is switched common to its emitter and is present at the base of the solenoid driver transistor, causing it to go on. When transistor Q2 comes on, its collector approaches ground, thus referencing the charge on capacitor C1 to ground. The positive side of capacitor C1 is now +20 volts with respect to ground. Capacitor C1 now attempts to discharge and recharge to −20 volts through resistor R4 from the emitter base junction of transistor Q2 and the emitter-base junction of the solenoid driver transistor. When the capacitor passes through zero potential and begins to accumulate a negative charge, it turns on transistor Q1.

When transistor Q1 conducts, its collector approaches ground, allowing the +5-volt bias through resistor R5 to turn off transistor Q2. The time involved for capacitor C1 to discharge to zero volts and to accumulate enough negative charge to turn on transistor Q1 is determined by the value of resistor R1 and the value of C1. This R-C time determines the duration of the output pulse on lead Q1.

COUNTER OR DIVIDER: FIGURE 8, block M shows a counter stage. It is also a divider stage when used to divide down the output of the keyboard frequency standard. When voltage is initially applied to this circuit, one of the transistors will conduct due to circuit value imbalance. Assuming transistor Q1 conducts, its collector is at −0.15 volt with respect to ground. This potential is present through resistor R2 at the anode of diode CR1. Since transistor Q2 is off, −10.5 volt is present at its collector and this potential is present through resistor R8 and at the anode of diode CR2.

When a positive pulse comes in at point S, it passes through capacitor C1 and capacitor C2. Since diode CR2 has a large negative potential at its anode, it blocks the pulse. Diode CR1 passes the positive pulse, provided the pulse is large enough to override the −0.15 volt present at the anode. In order to turn off transistor Q1, the pulse must also be of sufficient amplitude to override the −0.35-volt potential at the base of transistor Q1. When transistor Q1 turns off, its collector goes to approximately −10.5 volts due to the 1.5-volt drop across resistor R1. This 1.5-volt drop is due to the small current from −12 volts through resistor R1, resistor R3, and resistor R5 to +5 volts. The base of transistor Q2 is now at approximately −5.6 volts and therefore turns on. With transistor Q2 on, its collector is at −0.15 volt and the collector of transistor Q1 is at −10.5 volts. This minus voltage is present through resistor R2 and is at the anode of diode CR1. The −0.15 volt at the collector of transistor Q2 is present through resistor R8 and is at the anode of diode CR2.

The next positive pulse at point S will be blocked by diode CR1 and passed by diode CR2. Transistor Q2 now goes off and transistor Q1 comes on. Successive positive pulses at point S will trigger transistor Q1 and transistor Q2 alternately.

FREE-RUNNING MULTIVIBRATOR: FIGURE 8, block N shows an astable or free-running multivibrator that is used as a timing standard when extreme accuracy is not required. When the supply voltage is present and provided point A is at ground potential, the multivibrator will start to cycle. Component value tolerances are such that there will be an imbalance, enough such that one transistor will conduct first. Assuming transistor Q1 conducts first, capacitor C2 will charge through resistor R4 and the base-emitter junction of the transistor Q1. Capacitor C2 charges to the potential at the base of transistor Q1 which is approximately −0.35 volt with respect to ground. Since capacitor C1 has discharged any potential it may have accumulated, the negative potential through resistor R2 turns on transistor Q2. With transistor Q2 on, capacitor C1 charges through resistor R1 and the base-emitter junction of transistor Q2. Capacitor C2 is now discharging through resistor R3 and transistor Q2. Capacitor C1 charges to the potential at the base of transistor Q2 which is approximately −0.35 volt with respect to ground, allowing the negative potential through resistor R3 to turn on transistor Q1. This cycle repeats itself as long as voltage is applied and A is at ground potential. If ground potential is removed from A, transistor Q1 will be off and transistor Q2 will conduct until point A is returned to ground, allowing the cycle to continue.

EMITTER FOLLOWER: FIGURE 8, block P shows an emitter follower circuit. Transistor Q1 is normally off due to the +5 volts reverse bias on its base. A logic 0 level applied to input lead A turns transistor Q1 on in series with a driving transistor in the following stage. (See the ribbon lift driver circuit on FIGURE 12.) Since the emitter of transistor Q1 is now close to ground potential through the following stage, the output on lead T is actually negative-going (from +5 volts to 0 volt). Therefore, the circuit is an emitter follower in that a negative input produces a negative output.

KEYBOARD LOGIC

*Characters typed at line speed or less*

READ DELAY: Refer now to logic diagram FIGURE 9 (FIGURES 9A and 9B) and timing chart FIGURE 10. For each character typed, the universal bail (U-bar switch 148) contacts provide a negative read pulse which turns on a transistor Q1. A positive-going output pulse from transistor Q1 sets the counter input gate register 210 through a pedestal gate P2. A positive-going transition on the logic 1 output of the counter input-gate register 210 sets the read delay register 220 (transistors Q9, Q10) through pedestal gate P6. After 7 ms., the read delay one-shot 220 provides a positive output pulse which gates the typed character into the five stages of the keyboard parallel register group 218. This delay insures that any vibration in the reed switch contacts will die down before the ground potentials provided through the reed code switches 146a through 146e are used to permutatively set the desired registers in register group 218.

KEYBOARD LOCK: The same positive-going transition which triggers the read delay one-shot 220 also sets the keyboard lock register 222 through a pedestal gate P3. A positive output from this lock register 222 turns off transistor Q6 which in turn allows a keyboard lock high power driver transistor Q1 to turn on and energize the keyboard locking solenoid 230.

COUNTER START: With the counter input gate 210 in the set condition, the positive output level on the 1 side conditions a pedestal gate P10 (see center of FIGURE 9) to pass positive output pulses from the constantly running frequency divider 224. The pulses step the low-speed 3-stage keyboard counter 226 to allow it to gate the registered character from register 218 onto the outgoing line. FIGURE 12 depicts a situation where the counter 226 is not started until after the 7-ms. delay from read delay one-shot 220, but it is just as probable that the counter 226 will be started before the delay ends. This would not present a problem since the start pulse sent to the outgoing line is always the same, does not depend on which character has been typed, and required 13.3-ms. which assures the 7-ms. delay will be completed before the code bits from register 218 are permitted to transfer to the low speed counter 226.

SENDING A CHARACTER: Under control of the selected one of the tuning fork frequency standards 232, the frequency divider 224 steps the keyboard low-speed counter 226 at the bit speed of the outgoing line. In the reset condition, the first stage A of counter 226 is in the 0 condition. Therefore, a negative level is available on leads $A_1$, $B_0$, and $C_0$. Negative levels are used to prepare the parallel to serial OR gates 227 (OR11 through OR16) to gate the registered character from register 218 onto the line.

Spaces rather than marks are registered in the parallel register group 218. When a typing key is depressed, one of the code bail switches 146a through 146e closes for each space in the Baudot code of the character. The read delay one-shot 220, after its 7-ms. delay, gates the space indications of the code bail switches into the five stages of the parallel register group 218. Therefore, each space in the character code is represented by a set stage. Since parallel to serial OR gates 227, OR11 through OR16, require all but one negative input to provide a positive-going output transition, the logic 0 output sides of the five parallel register stages are wired to the OR gates 227. For example, if the first code element is a space, register 218 stage A (transistors Q1, Q2) is set to the 1 condition, and the 0 output lead provides a negative input to gate OR12. Similarly, if the second code element is a mark, the register 218 stage B (transistors Q3, Q4) remains in the 0 condition, and the 0 output lead provides a positive input to gate OR13.

As the first pulse from the frequency divider 224 steps the keyboard low-speed counter 226 once, the first counter stage A changes to the 1 condition. This provides a positive-going transition on the 1 output lead which causes the second counter stage B to change to the 0 condition. Negative outputs are now available on counter leads $A_0$, $B_1$ and $C_0$, allowing parallel to serial start gate OR11 to supply a negative level input to gate NAND 1. Any one negative input to gate NAND 1 causes it to provide a positive level output which turns off transistor Q21. The 1200-cycle, free-running multivibrator 234 is kept running by ground potential supplied by the collector of transistor Q21. With transistor Q21 turned off by gate NAND 1, the multivibrator stops and 1200-cycles per second tone is no longer placed on the outgoing line. Lack of tone represents the start signal and continues until the counter is stepped a second time. The tone generator 234 (Q21 and MV), per se, is not part of this invention.

As the second pulse from the frequency divider 224 steps the counter 226 once, the first counter stage A changes back to the 0 condition, the second counter stage B remains in the 0 condition, and the third counter stage C remains in the 1 condition. Negative outputs are now available on counter leads $A_1$, $B_1$, and $C_0$, allowing parallel to serial gate OR12 to supply a negative level input to gate NAND 1 if the first code element registered is a space. A negative input to gate NAND 1 allows it to provide a positive level output to keep transistor Q21 off and the 1200-cycle multivibrator tone generator 234 in the off condition. If the registered code element is a mark, parallel to serial gate OR12 provides a positive output as do all the other parallel to serial input gates OR11, and OR13 through OR16. All positive inputs to gate NAND 1 cause it to provide a negative output which turns on the tone generator transistor Q21. With transistor Q21 on, the 1200-cycle multivibrator tone generator 234 turns on and supplies the required 1200-cycle marking tone to the outgoing line.

Succeeding pulses from the frequency divider 224 continue to step the low-speed counter 226 so that parallel to serial gates OR13, OR14, OR15, and OR16 successively have negative inputs from the counter. Each of these OR gates 227, which has a negative input from the corresponding stage of the parallel keyboard register group 218, provides a negative input to gate NAND 1, allowing the 1200-cycle multivibrator MV to turn off (no tone) and thus indicate a space on the line.

After the last code element is gated onto the line, the counter 226 is stepped again to the $A_1B_1C_1$ condition at the beginning of the stop pulse of the outgoing character. The positive-going transition on output lead $C_1$ resets the first stage A of the counter 226 through gates P37 and P34. This extra step returns the counter 226 to the reset condition, ready for another character. The positive pulse on lead $C_1$ also triggers the counter input gate reset (1-ms.) delay one-shot 228. Further, the positive pulse on lead $C_1$ resets the playback time base gate 236 (upper right hand corner of FIGURE 9B).

As the reset delay 228 is first triggered, the positive-going transition on the logic 1 output lead resets the counter input gate register 210 (upper left hand corner of FIGURE 9A) via gate P8. As the reset delay 228 returns to its normal condition, it resets the parallel register group 218 via gates P16 through P20.

Referring back to the read delay one-shot 220 which gates the typed character into the parallel register group 218, its positive output resets the keyboard lock register 222 to allow another character to be typed on the keyboard. The positive level on the 0 output lead from keyboard lock register 222 prepares gate P8 for the subsequent trigger pulse from the reset delay (1-ms.) one-shot 228. The negative level on the keyboard lock register output 1 blocks gate P9 so that the pulse from reset delay 228 will not trigger the 7-ms. read delay 220.

Character bursts typed faster than line speed

To accommodate two-character high speed typing habit bursts, the keyboard lock mechanism (not shown) locks and maintains the code bails set up by the second typed character locked until the preceding character is gated onto the outgoing line. This is accomplished electronically as follows.

When a character is typed before the preceding character is sent, the closed U-bar reed switch contacts 148 will have set the keyboard lock register 222 through gate P3. The counter input gate register 210 is already in the set condition and therefore provides a positive level to gate P3. Nothing more happens until the pulse from reset delay 228 triggers the 7-ms. read delay 220 through gate P9. Note that gate P8 now *will not* pass the reset delay pulse since the keyboard lock register 222 is in the set condition and thereby provides a negative blocking level to the gate P8.

As soon as the first character is gated onto the outgoing line, the 1-ms. reset delay 228 triggers the 7-ms. read delay one-shot 220. One (1) ms. after the 7-ms. read delay 220 is triggered, the reset delay 228 returns to its normal condition and in so doing resets the parallel register group 218 via gates P16 through P20. When the 7-ms. read delay 220 returns to its normal condition, it sets the parallel register group 218 via encoding switch gates P11 through P15, and resets the keyboard lock register 222 through gate P5, turning off the driver transistor Q1 and de-energizing lock solenoid 230.

REPEAT CHARACTERS: As long as the REPEAT key (to be described) on the keyboard and any typing key are held down simultaneously, the typed character is sent repeatedly as follows:

The depressed typing key causes the U-bar contacts 148 to close and turn on transistor Q1. Ground potential through transistor Q1 now sets the counter input gate register 210 and marks the contacts of REPEAT switch 320.

The closed REPEAT key switch 320 extends this ground potential from transistor Q1 to the level input of gate P10 through diode CR1 to allow the frequency divider 224 to run the low-speed counter 226 continuously. Also, the REPEAT key switch closes the ground potential to the level input of gate P9 to allow the reset delay 228 to trigger the read delay 7-ms. one-shot 220 after every countdown of the counter 226. Initially, the read delay one-shot 220 is triggered through gate P6 as the REPEAT key switch 320 is first operated.

After each 7-ms. read delay, the positive output pulse from the delay one-shot 220 gates the typed character into the parallel register group 218 via encoder switch gates P11 through P15. Both the counter input gate register 210 and the keyboard lock register 222 cycle once and then remain in the reset condition because no further positive pulses are available to set the counter input gate 210.

INHIBITING KEYBOARD TYPING: The recorder 108 during the SEND RECORD mode (as will be described under the following section on Recorder Logic) inhibits the normal effects of typing by closing a ground potential to lead SRK (see upper left of FIGURE 9A) and through diode CR10 to prevent U-bar transistor Q1 from turning on so long as the inhibit signal prevails. Similarly, the recorder end-of-tape contacts will close a ground potential to lead EOTS (also upper left of FIGURE 9A) and through diode CR9, keeping U-bar transistor Q1 off when the end-of-recorder-tape has been reached.

RECORDER SENDING: During the SEND RECORD mode, the low-speed 3-stage keyboard counter 226 is used to gate characters onto the outgoing line as the recorded character codes play back from the magnetic tape. The keyboard counter 226 is started by the recorder closing a ground potential to the IRST lead (upper right of FIGURE 9B and lower right of FIGURE 11B) through gate P35 to trigger the playback time base gate register 236. The resultant positive output level, on the logic 1 lead, conditions a gate P27 to allow pulses from the keyboard frequency divider 224 to step the low-speed 3-stage counter 226. At the end of the 3-stage counter 226 countdown, ground potential on counter 226 output lead $C_1$ resets the playback time base gate register 236 through a pedestal gate P36. The mode panel electronics circuitry provides ground potential on keyboard input lead RWS only during the SEND RECORD mode. This ground potential will condition gate P35 to allow pulses received from the recorder on lead IRST to set the playback time base gate register 236.

MAGNETIC TAPE RECORDER LOGIC

Description of the recorder logic will refer primarily to FIGURE 11 (FIGURES 11A and 11B), secondarily to the recorder operational timing charts of FIGURES 19–23 and when necessary will refer to the inter-related keyboard electronics shown in the keyboard logic diagram of FIGURE 9.

REWIND: Depression of the REWIND pushbutton 136 on the recorder monitor panel (FIGURE 1) closes a switch 137 to lead RWS and triggers an advance delay one-shot 322 through gate OR1. The delay introduced by the one-shot 322 has no purpose during rewind, but it is helpful in preventing tape advance caused by switching surges from the mode panel over lead ADJ from STORE relay K–6. At the end of the 6-ms. delay the one-shot 322 triggers the advance one-shot 240 through a gate P24. It is reasonable to assume that the operator will depress the REWIND pushbutton for at least 166-ms. which will cover the required on-time of the two one-shots 322 and 240 (see rewind timing chart FIGURE 16). Pedestal gate P1, conditioned by the depressed REWIND pushbutton 136, will then allow a pulse from the 0 side of the advance one-shot 240 to reset the rewind register 252 as described in the following five paragraphs.

As soon as the advance one-shot 240 is triggered, it starts three mechanical, recorder tape, feed and step operations. The positive level on the logic 1 output lead allows the advance multivibrator 242 to free-run for 166-ms. and thereby to supply three triggering pulses to feed one-shot 244 through gate P2.

Each time the feed one-shot 240 is triggered, it turns on a high-power recorder driver transistor Q3 to energize the feed solenoid 246. This causes the sprocket drive mechanism (to be described in the following section on recorder mechanics) to feed the tape one unit *towards* the record head, as will be described hereinafter.

Each time the tape feed one-shot 244 returns to the normal condition, it triggers the record stabilizer, 7-ms. delay, one-shot 324 through gate P4. The delay introduced by this stabilizer one-shot 324 guarantees that the mechanical feeding mechanism will have completed its funtcion and come to rest before the stepping solenoid 250 is energized. At the end of the 7-ms. delay, the stabilizer one-shot 324 triggers the step one-shot 248 through gate P39. The step one-shot 248 turns on a high-power recorder driver transistor Q1 to energize the step solenoid 250, which causes the sprocket drive (see section on recorder mechanism) to step the tape one unit *over* the recorder head.

When the advance one-shot 240 returns to its normal condition after the three feed and step tape advance operations, it resets the rewind register 252 through gate P1. The reset pulse turns off transistor Q6 in the rewind register. Transistor Q5 is in series with transistor Q6 and therefore turns off also. The collector of transistor Q5 goes negative and allows high-power transistor Q2 to turn on and energize the rewind solenoid 254 which disengages the tape feed and step mechanisms and allows a negator spring, previously placed in power storage condition by the feed mechanism, to drive the tape back onto its supply spool.

When the tape is completely rewound, start-of-tape contacts 256 on the commutator (see FIGURE 27) are bridged and provide a ground potential level to (a) start the advance multivibrator 242 through diodes CR22, CR24, and CR4; (b) prepare a gate P8 so that the advance multivibrator 242 can set the rewind register 252 at the end of the first multivibrator cycle; and (c) light the green start-of-tape lamp 139 on the keyboard panel (see FIGURE 1).

The advance multivibrator 242 will cause feeding and stepping to start again under control of the feed and step one-shots 244 and 248 and to continue until the start-of-tape contacts 256 open again as the negator commutator starts forward rotation under tape feed stepping action, a period that lasts long enough to allow at least three feed and three step operations at the beginning part of the tape. When the start-of-tape contacts 256 open, the advance multvibrator 242 turns off, stopping the feeding and stepping operations. The recorder will now be readied for the operational STORE or SEND RECORD modes.

STORE (logic diagram FIGURE 11 and record timing charts FIGURES 12 and 13): When the STORE pushbutton (see FIGURE 3) is depressed, switch S5 closes, mode panel STORE relay K6 operates, which closes its relay contacts 2 and 5 and triggers the advance delay one-shot 322 through gate OR1. After 6-ms., this one-shot 322 triggers the advance one-shot 240 through gate P24. Ground potential from the STORE pushbutton switch S5 also operates recorder relay KR1 (see upper left of FIGURE 11B) which closes its relay contacts 2, 5 and 1, 6 and connects the record windings 260 and 262 of the record head to the record clock and character transistors Q10 and Q15. Current now flows through the two record windings 260 and 262 in preparation for recording.

The advance one-shot 240 now causes three feed and step operations in the same manner as discussed previously under the REWIND operational mode.

Depression of any keyboard key stores a character code in the keyboard register group 218 (see FIGURE 9) and starts the keyboard low-speed counter 226 (see FIGURE 9). As the keyboard low-speed counter 226 is first stepped from the reset condition to the start condition, it provides three negative inputs to the recorder on leads $A_0 B_1 C_0$ (see left side of FIGURE 11). Recorder gate OR6 has all its inputs negative and therefore cannot provide a triggering pulse to pedestal gate P36. As the keyboard counter 226 is stepped a second time, a positive pulse appears on lead $A_0$ and opens the recorder gate OR6. The positive output pulse from gate OR6 now triggers the tape feed one-shot 244 through the pedestal gate P36.

Magnetic tape feeding and stepping now starts and is under control of the low-speed counter 226 in the keyboard, the feed one-shot 244 triggering the step one-shot 248 through the 7-ms. delay stabilizer one-shot 324, as discussed above under the REWIND operation sub-section.

When the feed one-shot 244 returns to normal and triggers the step one-shot 248, it also starts the high-speed multivibrator 264 as follows:

(1) A positive-going transition on the logic 0 output lead of the feed one-shot 244 triggers a multivibrator gate delay one-shot 326 through a pedestal gate P9. After an 11-ms. gate delay, which allows the tape step mechanism time to start moving the tape over the record head (see timing chart of FIGURE 12), the gate delay one-shot 326 returns to normal. The resulting positive-going transition sets the multivibrator gate register 328 through a pedestal gate P28. (2) In the set condition, the multivibrator gate register 328 provides ground potential to the high-speed multivibrator 264 to allow it to free-run and step the high-speed counter 266. When the high-speed counter 266 finishes its countdown, it resets the multivibrator gate register 328 through a gate P38. In the reset condition, the multivibrator gate register 328 turns off the high-speed multivibrator 264 by removing ground potential from it.

The positive-going transitions from the high-speed multivibrator 264, in addition to stepping the high-speed counter 266, also trigger the delay clock one-shot 268 through a pedestal gate P37. A positive-going transition on the logic 1 output of the delay clock one-shot 268 turns off record clock transistors Q9 and Q11. Transistor Q9, in turning off, turns on record clock transistor Q10 and current flow through the record clock winding 260 is instantly reversed. When the delay clock one-shot 268 returns to normal, transistor Q11 turns on and Q10 turns off, again reversing the current through the record clock winding 260.

The magnetic tape has an oxide coating of a magnetizable material on it. When the tape is put into the magnetic field created by the current through the winding 260, the oxide particles will orientate themselves in accordance with that field. When the current, and therefore the field is reversed, the oxide particles will arrange themselves in just the reverse orientation. This is the principle employed to record information on the tape as it stepped over the record head. Previous recorded messages need not be erased by a special erase head as erasure is accomplished by rearrangement of the oxide particles in recording the new message.

Referring to FIGURES 12 and 13 (timing line for OUTPUT OF 2 kc. mv.), eight digital clock pulses or bits are recorded serially on one track of the tape by the record clock winding 260 during one step (0.1″) of tape movement over the head. These pulses are later used during the SEND RECORD mode to gate character information off of the tape and into the keyboard register group 218.

Each time the delay clock one-shot 268 returns to normal, it can trigger the delay character one-shot 270 through pedestal gate P19. However, triggering of the delay character one-shot 270 is permitted only if the high-speed counter 266 gates a space bit from the keyboard register 218 through the recorder parallel to serial gates 330 (OR11 through OR15). Leads D1 through D5 at the center bottom of FIGURE 11 (from respective keyboard register output leads D1 through D5, FIGURE 9), provide a negative level for a keyboard registered space, and a positive level for a keyboard registered mark. Recorder gates OR11 through OR15 successively provide negative inputs to recorder serial gate NAND1 for each registered space bit. Any negative input to recorder serial gate NAND1 turns it on to provide a positive output that will allow the pedestal gate P19 to pass triggering pulses from delay clock 268 to the delay character one-shot 270.

Each time the delay character one-shot 270 is triggered, it turns off record character transistors Q14 and Q16. Transistor Q14, in turning off, turns on transistor Q15. This reverses the current direction through the record character head winding 262. When the delay character one-shot 270 returns to normal, it turns on record character transistors Q14 and Q16. Transistor Q16 turns off transistor Q15 to again reverse the current direction in the record character head winding 262.

For each recorded character (0.1″ of tape), the tape is conditioned with eight magnetized clock bits 332 on one of its tracks (see FIGURE 29 and also third from bottom line on timing charts, FIGURES 12 and 13) and one to five magnetized information bits 334 on the second track (see bottom line on timing charts, FIGURES 12 and 13). Each information bit 334 is preceded slightly by the corresponding clock bit 332 due to the delay of the delay clock one-shot 268. The last three clock bits are recorded on the tape but have no purpose in this exemplary apparatus.

SEND RECORD (logic diagram FIGURE 11 and timing charts, FIGURES 14 and 15): After storing a message in the recorder, the operator depresses the REWIND pushbutton 136 to position the message tape for sending to the outgoing line. Depression of the SEND KEYBOARD and SEND RECORD pushbuttons (see FIGURE 3), through their associated switches S2 and S7 (see FIGURES 6A and 6B) causes operation of mode panel SEND RECORD relay K9. Through its contacts 2 and 5, relay K9 closes ground potential to lead PBS to start the playback operation.

Ground potential on the lead PBS triggers a switch-noise inhibitor one-shot 336 (upper part of FIGURE 11B) which supplies a 7-ms. delay before allowing the search register 276 (upper center of FIGURE 11A) to be set. This time delay insures that noise generated by the relay contacts and picked up by the playback windings 280 and 282 will have stopped before the search operation is started. The playback clock counter-driver one-shot 338 (right center of FIGURE 11B) and the playback read one-shot 340 cannot be triggered by this switch-contact noise because the switch-noise inhibitor one-shot 336 clamps the output of the two one-shots through diodes CR11 and CR12, which prevents the inadvertent triggering.

The ground potential from relay K9 contacts 2 and 5 on lead PBS also operates the recorder playback relay KR2 which, through its contacts 1, 6 and 2, 5 connects the playback clock head winding 280 and playback character head winding 282 to playback circuit transistors Q10 and Q13, respectively. The ground potential on lead PBS also conditions an inhibit inductive spikes one-shot 342 so that it can be triggered by the tape step one-shot 248 through line TSS, capacitor C12 and line RC1.

After its 5-ms. delay, to allow relay-contact noise to stop, the switch-noise inhibitor one-shot 336 resets, and in so doing sets the search register 276 through pedestal gate P23. The positive output level on the logic 1 output lead of the search register 276 starts the advance multivibrator 242 through diodes CR21 and CR4. The positive level also conditions search pedestal gate P3 to allow positive transitions from the advance multivibrator 242 to trigger the tape feed one-shot 244, and conditions the search pedestal gate P5 to allow positive transitions from the tape feed one-shot 244 to trigger the tape step one-shot 248. Feeding and stepping of the magnetic tape starts and continues until a magnetized clock pulse on the tape is detected by playback clock winding 280.

Each time the tape step one-shot 248 is triggered, it triggers the inhibit inductive spikes one-shot 342. As shown in the timing chart of FIGURE 14, the 5-ms. "on-time" overlaps the time the tape step solenoid 250 is being energized and de-energized and is therefore creating a magnetic field that can cause inductive spikes into transistor Q10 in the counter driver control 284 and transistor Q13 in read control 286. While it is on, the inhibit inductive spikes one-shot 342 places a negative potential on the emitters of control transistors Q12 and Q15. This prevents the transistors from being turned on by the inductive spikes.

The actual 0.1" step movement of the tape over the head is occurring after the step solenoid 250 is de-energized and therefore after the inhibit inductive spikes one-shot 342 returns to normal. When a magnetized clock bit 332 on the tape (see FIGURE 15) induces a current pulse in the playback clock head winding 280, the "always-on" playback clock amplifier transistors Q10 and Q11 will amplify the clock pulse enough so that its negative-going half cycle at the collector of transistor Q11 can turn on the counter switching control transistor Q12.

Counter control transistor Q12 supplies a positive pulse to trigger the counter driver one-shot 338 through pedestal gate P29. A positive-going transition on the logic 1 output of counter driver one-shot 338 is extended over lead IRST to the keyboard (see FIGURE 9) to set the playback time base gate register 236. Lead IRST is pulsed once for each magnetized clock pulse on the tape, but only the first pulse is useful to the keyboard. Once the playback time base gate register 236 in the keyboard electronics is set, it will remain set until reset by the keyboard low-speed counter 226 (FIGURE 9) at the end of its countdown.

The first positive pulse from the counter driver one-shot also resets the search register 276 through pedestal gate P22. With the search register 276 turned off, control of tape feeding and stepping now comes from the keyboard electronic circuitry. Feeding is triggered over leads $A_0B_1C_0$ from the keyboard to record gate OR6 and through pedestal gate P36 to the tape feed one-shot 244, as the keyboard low-speed counter 226 is stepped from the start pulse condition to the first code bit condition. Stepping is triggered by a pulse over lead C1, from the low-speed counter 226 through recorder pedestal gate P6 to the tape step one-shot 248, as soon as the fifth bit of the character is gated by the keyboard electronic circuitry onto the outgoing line.

Each of the eight tape recorded clock bits provides a playback clock pulse 332 and triggers the counter drive one-shot 338 which in turn steps the high-speed counter 266 through gate P26. As the high-speed counter 266 steps, it gates the recorded character into the keyboard register group 218 via lines E1 through E5 by successively preparing the recorder serial-to-parallel gates OR16 through OR20.

When a character bit on the tape causes a current pulse 334 in the playback character head winding 282, "always-on" playback character amplifier transistors Q13 and Q14 amplify the pulse enough so that its negative-going half cycle at the collectors of transistor Q14 can turn on the read control switching transistor Q15.

Read character pulse control transistor Q15 supplies a positive pulse that triggers the playback read one-shot 340 through gate P30. A positive-going transition on the logic output of playback read one-shot 340 opens whichever of the record serial-to-parallel gates OR16 through OR20 has three negative inputs from the high-speed counter 266. Each gate OR16 through OR20 that passes the positive pulse from the playback read one-shot 340 supplies a positive setting pulse to the register group 218 in the keyboard via lines E1 through E5.

As previously described in this section and as shown on FIGURE 14, the high-speed counter 266 in the recorder is much faster than the low-speed counter 226 in the keyboard. Therefore, the five bits 334 of the recorder character are gated into the keyboard register 218 while the keyboard low-speed counter 226 is still gating a start pulse onto the outgoing line.

As long as characters continue to appear on the tape, the tape feeding and stepping operations will continue under control of the keyboard low-speed counter 226. Lack of a tape recorded character will mean that no further character is gated into the keyboard register and tape feeding and stepping, which is now under control of the keyboard electronics, will cease and the sending operation is stopped.

MAGNETIC TAPE RECORDER UNIT MECHANICS

The keyboard construction is not necessary for a description of the present invention, however it has been fully described in a co-pending application Serial No. 481,797, filed August 23, 1965, covering the keyboard per se. The recorder unit 108 is an extremely rugged and compact, magnetic tape, combination recorder and reader. Actual dimensions of an exemplary production unit approximate 5" x 5" x 4". Its power, insofar as tape movement is concerned, is derived wholly from a self-contained feed solenoid, rewind power being derived from a negator spring which is wound by and stores energy derived from the feed solenoid during tape take-up movement. The tape is a semi-permanently installed, thin plastic strip coated with a film of magnetizable oxide. A suitable plastic for making the tape body is "Mylar."

The tape recorder, as has been hereinbefore described in the section devoted to the recorder electronic logic (see FIGURE 11), utilizes part of the keyboard electronics during storing and playback transmission of messages and hence, in the exemplary embodiment, is inter-related electrically, electronically and functionally with the keyboard unit 106. Nevertheless, it is to be understood that either the magnetic tape recorder or the keyboard can be constructed as units, apart from the described inter-relationship between the two units, if a requisite portion of the mode selection panel and keyboard electronics is included with either unit. Thus the recorder, with appropriate logic, could take the place of (1) a tape perforator and (2) a tape reader-transmitter. As will be described for the exemplary embodiment, the tape supply is only sufficient for a single normal message (3600 characters), however the recorder could be structurally enlarged to mount larger tape spools and the tape drive power mechanism could be modified to drive and rewind the larger take-up and supply, as by an electric rotary motor or a stronger feed solenoid for take-up and a motor drive for rewind.

With reference to FIGURES 17 and 19, the recorder unit 108 has a basic support structure constructed of a base plate 530 apertured to be bolted in assembled position on the Unit 1 drawer (in the position indicated in FIGURE 2), a vertical front mounting plate 532 and a vertical mid-mounting plate 534 both of which are suitably, rigidly secured to the base plate and to each other. An auxiliary, rear mounting plate 536 is secured by bolts to and spaced from the rear of the mid-plate 534. Four printed circuit board sockets 537 *a, b, c* and *d* are suitably fastened by screws to the base plate 530. Printed cricuit boards 538 *a, b, c* and *d* (see FIGURE 17) plug into appropriate ones of the sockets 537a–537d, are clamped to the vertical mounting plates and contain the major portion of the recorder electronics. Three recorder driver transistors Q1, Q2 and Q3 are seen in FIGURE 19 mounted on the rear surface of the auxiliary bracket 536 which provides an adequate heat sink for the high power ZN458 transistors.

The mechanical tape driving and rewind mechanism will be described primarily with reference to FIGURE 18 and with secondary reference to FIGURES 17 and 19–24 for details. The front and rear perspectives afforded by FIGURES 17 and 19 provide an idea of the concise compact arrangement of the mechanism which is skeletonized and considerably expanded for clarity in FIGURE 18.

*Tape feed and step*

FEEDING is the operation which feeds a discrete signal portion of the tape 540 (0.1") toward the recording head 542 in preparation for the stepping operation. The head 542 is mounted on the front side of front mounting plate 532 and includes two cores for combination 2-track, alternative recording and reading, one core carrying the record clock and playback clock windings 260 and 280 respectively (see FIGURES 7 and 11), and the other core carrying the record character and playback character windings 262 and 282 respectively (see FIGURES 7 and 11).

The tape 540 has feed sprocket perforations, is stored on a supply spool 541, threads around an idler roller 542 journalled on a fixed stud in the front plate, around a toothed feed sprocket wheel 543, thence around a stabilizer roller 544 and to and over the recorder head 542.

The tape is held against the feed sprocket wheel 543 by a tape guide foot 545 which is mounted on two releasable studs secured on front plate 532. Clips on the ends of both studs rigidly maintain the guide 545 in proper position. The upper stud 546 also serves as a pivot post for a spring biased vertically disposed stabilizer roller lever 547, the upper end of which carries the stabilizer roller 544. Note that the stabilizer spring 548 biases the stabilizer roller 544 against the tape to take up the feed generated slack and any other incidental slack in the tape between the feed sprocket wheel 543 and the stepping sprocket wheel 549. As will be hereinafter described, the stabilizer roller effect is negated during REWIND.

The power to feed the tape 540 is obtained from the feed solenoid 246 which is mounted on the rear side of the front mounting plate 532. When feed solenoid 246 is energized (see also FIGURE 22), solenoid plunger 552 is pulled into the coil. Plunger 552 is pinned to a feed lever link 553 which in turn, is pinned to a feed lever 554 pivoted on the rear of the front plate. Lever 554 pivotally carries a spring biased driving pawl 555 and forces it into drive engagement with a feed ratchet wheel 556 and forces the ratchet wheel to rotate one tooth, the amount of feed rotation being limited by an adjustable feed pawl eccentric stop pin 557.

Ratchet wheel 556 is non-rotatably secured to the feed sprocket wheel shaft 558 and thus rotates the feed wheel 543 and causes the tape 540 to *feed* one space toward the recorder head 542. The feed solenoid 246 in de-energizing, allows spring 559 to pull the solenoid plunger 552, the feed lever link 553, and the feed lever 554 back to their normal positions. The normal position is with the feed lever 554 against a second adjustable eccentric stud 560.

A feed ratchet detent pawl 562 is pivotally mounted on a pin fixed in the front side of the mid plate 534 so the detent pawl is disposed substantially diametrically opposite the drive pawl 555. Detent pawl 562 is biased by a coil spring 563 with its tooth in such engagement with the feed ratchet 556 to prevent the feed shaft 558 from rotating backwards. Clearly seen in FIGURE 22, short levers 564 and 565, rigid with the feed drive pawl 554 and feed detent pawl 562, respectively, are directly toward the feed shaft 558 and constitute ratchet release fingers utilized to lift both of the pawls away from ratchet engagement during a REWIND operation, as will be hereinafter described. After the just described single tape feed step action of the feed sprocket 543 is completed, the stabilizer roller 544, under the bias of its spring 548 takes up the slack which was provided by the feed step and keeps the tape taut.

STEPPING is the operation which actually moves the tape 540 over the recording head 542 and thence toward the take-up spool 566. A tape stepping action invariably occurs immediately following a feed action. The accurately indexed amount of slack which is placed in the tape 540 by the tape feed operation, is pulled over the recording head 542 by the take-up step sprocket wheel 549, over which the tape passes and feeds downwardly to the take-up spool 566. Power to step rotate the stepping sprocket 549 is always constant, being derived from a coil spring 567 in an escapement controlled lost motion step drive mechanism 568 shown schematically in FIGURE 18 and in detail in FIGURES 23 and 24. A gear 569 secured to rotate with feed sprocket shaft 558, meshes with an idler gear 570, freely rotatable on a post fixed to the rear side of front plate 532, the idler gear in turn driving a stepping input gear 571 which is freely rotatably mounted on the step sprocket shaft 572. Feed shaft gear 569 and stepping gear 571 have the same number of teeth and hence, stepping gear 571 rotates in the same direction and through an accurately indexed angular increment equal to the indexed angular increment of drive which was imparted to the feed sprocket wheel 543 by the feed drive pawl 555.

Non-rotatably fixed to the stepping sprocket shaft 572 is a toothed escapement stepping ratchet 574. Two spaced apart coaxial plates 575 and 576 (see FIGURE 23) are non-rotatably secured in facing, slightly spaced apart relationship to the stepping gear 571 and stepping ratchet 574, respectively. Gear plate 575 has three lugs 577, 578 and 579 (see FIGURE 24) extending axially toward the ratchet plate 576, designated as driving lug 577, stop lug 578 and rewind stop lug 579. The two lugs 578 and 579 straddle a stepping ratchet plate stop lug 581 with sufficient clearance to enable an indexed angular increment of play between the gear 571 and ratchet 574 when the gear 571 is rotated one feed space. (Note: as will be described the ratchet 574 *cannot rotate* while the gear 571 is being driven through the gear train from the feed shaft 558.) The aforedescribed escapement coil tension spring 567 is anchored between the gear plate driving lug 577 and the ratchet plate driven lug 580. Thus, when the stepping gear 571 rotates one index space, its stop lug 578 rotates the one index space away from the ratchet stop lug 581 and stops, at the same time the gear driving lug 577 rotates one space, tensions the spring 567 and stops. A one space stepping condition is thus pre-set to occur, under a standard spring tension force, for the stepping ratchet 574, its shaft 572 and the stepping sprocket 549 which is non-rotatably connected to shaft 572.

Control of the stepping sprocket 549 is accomplished by a pen type step solenoid 250 which is mounted between the front and mid mounting plates by a suitable bracket secured to the upper portion of the mid mounting plate 534. The solenoid plunger 586 is forced out of the solenoid coil when it is energized, engaging a lever abutment 587 on a stepping ratchet pawl 588 to pivot the pawl 588 away from engagement with the toothed stepping ratchet wheel. This release will permit the tensioned drive spring 577 to rotate the ratchet wheel 574, its shaft 572 and the stepping sprocket 549 one space, where the ratchet plate stop lug 581 abuts the now stopped gear lug 578 to limit the stepping increment. The stepping pawl 588 is pivotally mounted on a post 589 fixed in the mid mounting plate and is biased toward engagement with ratchet wheel 574 by a coil tension spring 590. The solenoid 250 is almost immediately de-energized, permitting the step pawl to spring back and block the next ratchet tooth.

The tape stepping sprocket 549 thus pulls the indexed slack in the tape (0.1″), which was previously fed by the feed sprocket 543, over the recording head 542 at a constant rate. As the tape 540 is stepped over the stepping sprocket 549 the slack is taken up on the take-up reel 566 which is driven through a friction coupling by mechanism now to be described, at a higher angular speed than that of the feed and stepping sprocket wheels to keep the tape taut between stepping sprocket wheel 549 and the take-up spool 566.

Both the supply spool 541 assembly and the take-up spool 566 assembly are identical and hence only one will be described in detail with reference to FIGURE 25. A spool shaft 592 is rotatably journalled in a threaded bushing sleeve 593 secured by a nut 594 through an aperture in the front mounting plate 532. The hub of tape spool 541 is slid over a short stub front end of shaft 592 and securely clamped to the shaft by a screw 595 and a washer which also secures a tape retaining pin, bent lock clip 596. The Mylar tape 540 has a performed end loop (not shown) which is retained to the spool 541 by a pin 597 disposed through an appropriate aperture and into a groove 599 in the outer periphery of the spool hub. Before pin 597 is inserted, the tape end loop is placed between the spool flanges and into the groove 599, so when pin 597 is inserted into the spool, it passes through the tape loop. Clip 596 will retain the pin 597 in its tape loop retaining position.

The other end 600 of spool shaft 592, which projects past the rear end of its bushing 593, is made with a reduced diameter, has a threaded end and carries a rotatably mounted spool gear 601, a felt friction disc 602, a pressure plate 603, a coil pressure spring 604, a spring retainer plate 605 and retaining nut 606. The pressure plate 603 has its hub axially slotted to coact with a pin 607 fixed transversely in shaft 592, so that pressure plate 603 may have some axial play but is non-rotatably secured to shaft 592. The spring 604 presses the pressure plate 603, felt disc 602 and gear 601 against the shaft shoulder 608 and constitutes a friction slip coupling between gear 601 and spool shaft 592. The compression of spring 604 may be pre-adjusted by nut 606 but need not be very great in the exemplary embodiment since the combined weight of the spools and the tape is quite light. Gear 601 on the supply spool 541 and gear 601′ on the take-up spool 566 are identical and have a less number of teeth than the feed gear 569 and stepping gear 571. Therefore, since each derives its drive (when driven) by a direct gear train to the feed gear 569, each will tend to be driven a greater angular increment than the feed increment during each increment of feed shaft rotation, although as soon as the tape is taut the spool gear which is being driven will slip relative to the spool via the friction coupling.

During tape recording or playback the tape passes from the supply spool 541 to take-up spool 566 in a drive path connected through a shiftable idler gear 610 which meshes with feed shaft gear 569 and is carried by and rotatably journalled on a swinging shift lever assembly 611 which is pivotally carried by and depends from the feed shaft 558 between the front and mid mounting plates. Idler gear 610 always remains in mesh with feed shaft gear 569 and can be swung into mesh with either one of the spool gears 601 or 601′ by a controlled pivotal shift of the depending support lever 611 which is rocket by mechanism to be later described. Normally idler gear 610 is positioned to mesh with the take-up spool gear 601′ in which position it is free from meshed engagement with the supply spool gear 601. The spacing of the two spool gears 601 and 601′ is such that just before the teeth of idler gear 610 leaves engagement with one of the spool gears 601 or 601′ they will start into engagement with the other gear. During the REWIND mode of recorder operation, the idler gear 610 is swung away from take-up spool gear 601′ and into mesh with the supply spool gear.

Turning to FIGURE 26, it will be seen that stepping sprocket wheel 549 has a main body portion 614 with a hub to which is pinned a flat sprocket toothed disc 615. The disc is maintained in assembly by a rim ring 616, the center hub sleeve of the main spool body 614 being swaged or spun over to tightly clamp and retain the ring 616 and toothed disc 615 in place. The wheel hub 617 is in the form of an axial sleeve with a cross slot fitted over a transverse drive pin 618 in the stepping wheel shaft 572. Wheel 549 is thus non-rotatably connected to shaft 572 and is maintained on the shaft by a ring clip. The feed sprocket wheel 543 is constructed and secured to the feed shaft 55 in a manner similar to that just described for the stepping sprocket wheel 549.

Before proceeding to the mechanics by which the REWIND operation is accomplished, the description will now turn to the negator spring and commutator assembly.

THE NEGATOR AND COMMUTATOR assemblies 620 and 622 respectively are shown in skeleton arrangement in FIGURE 18, in detail layout cross-section in FIGURE 26 and in rear view perspective in FIGURE 19. The negator spring assembly 620 is mounted on the rear of mid mounting plate 534 and the commutator assembly 622 is mounted on the auxiliary mounting plate 536.

Each time the feed solenoid 246 is energized to rotate the feed ratchet 556, a small pinion gear 624 on the end of feed sprocket shaft 558 rotates a negator gear 625. This rotation unwinds a flat, crowned steel strip negator spring 626 from a negator spring supply spool 627 onto a spring output spool 628. This spring 626, wound up on spool 628, stores a bias force attempting to wind itself back on the supply spool 637 and thereby supplies a power source for the rewind operation. On the negator gear shaft 629 is mounted a pinion gear 630 which meshes with a large dielectric commutator gear 631.

Shown in FIGURE 26, the feed sprocket shaft 558 projects rearwardly through a bearing in mid mounting plate 534 and extends past the two negator spring spools 627 and 628, and has its terminal end cut to provide the integral small pinion 624. The small diameter negator spring supply spool 627 is freely rotatably mounted on bearings on a journal post 636 securely fastened to the mid plate 532 by nuts. On end of the crowned spring 626 is anchored to the supply spool and the spring is pre-set in a shape to coil itself around the small supply spool 627.

The large negator take-up spool 628 is non-rotatably and coaxially fastened to one side of the large negator gear 625 which in turn is non-rotatably secured to its shaft 629, as by a tight press fit. Negator gear shaft 629 is rotatably mounted in bearings retained in a retainer cup 638 which is fastened in an aperture in the mid mounting plate 534 and is disposed with its base directly rearwardlly. The negator take-up spool 628 has a coaxial opening sufficiently large to freely fit over the bearing retainer cup 638 so that the two spools 627 and 628 are positioned in coplanar relationship, i.e., so that the negator spring 626 can be pulled off of the supply spool in a straight path and be rewound on the take-up spool to which its other end is anchored. The large negator gear 625 is mounted so as to be in continuous mesh with the feed sprocket shaft pinion 624, and as the feed shaft is rotated in incremental feed steps, the negator gear will slowly pull the crowned pre-coiled spring 626 off the small supply spool and wind it on the much larger diameter take-up spool 628. It is a tendency of such crowned pre-set springs that they tend to wind themselves back to their original pre-set coiled dimension, and therefore the spring exerts a bias force on the take-up spool to rotate in the reverse direction as the spring attempts to rewind itself on supply spool 627. This reverse direction of rotation is, of course, normally prevented because negator gear 625, the meshed pinion end of feed sprocket shaft 558 and the engaged feed sprocket pawl 555 and its detent pawl 562 prevent such reverse rotation, except during a rewind operation, as will be described hereinafter.

The negator driven pinion gear 630 on negator gear shaft 629 may be separable or integral with the negator gear shaft, but in any event it is non-rotatably secured on the shaft 629, projects from the rear face of the negator gear 625 and provides a direct, but greatly stepped-down, drive from the feed sprocket shaft 558 to the dielectric commutator gear 631. In a sense this is also a direct drive connection from the stepping sprocket which differs from the feed sprocket only by the one lost motion spacing step in the feed direction and follows exactly in the rewind direction. Thus, the angular position of the commutator gear is a direct indication of the number of rotations of the feed and stepping sprocket wheels, and as such is used to determine (1) a start-of-tape position, (2) a 96% tape-out position and (3) an end-of-tape position.

The front face of the dielectric commutator gear 631 (see FIGURE 27) has four strips of copper 641, 642, 643 and 644 pressed onto it. When the gear 631 is mounted on auxiliary bracket 536, one of four contact plungers 645, 646, 647 and 648 rests against an associated one of these copper strips. Three of the copper commutator strips are called: the start-of-tape strip 641, 96% tape-out strip 642, and end-of-tape strip 643, while the fourth unbroken strip 644 is connected by a contact 648 to ground potential. When the commutator gear 631 has traveled 96% of one full turn, one of the contact plungers 647 shorts the 96% strip 643 to the ground strip 644, completing an electrical circuit and energizing the 96% amber lamp 140 on the keyboard unit (see FIGURES 1 and 3). At the end-of-tape position and at the start-of-tape position a similar shorting to ground by respective plungers 646 and 645 occurs for the other two commutator strips 642 and 641, respectively. When the gap moves away from the contact plunger, the circuits are broken and the respective lamps are de-energized.

Seen in FIGURE 26, the commutator assembly 622 (the gear 631 and contact plungers 645) are mounted on depending parallel walls of the rear auxiliary mounting plate 536. The dielectric gear 631 and a mechanical stop arm 650 fit over a sleeve hub 651 on the end of a stub shaft 652, the hub 651 being swaged or spun over to clamp and hold the stop arm and gear securely to the stub shaft 652. Stop arm 650 is disposed radially on the rear face of dielectric gear 631, extending to a terminal position close to the gear periphery where it ends in a forwardly bent stop finger 653 which passes through a slotted aperture 654 in gear 631 and projects a short distance from the front face of the dielectric gear. Stop finger 653 coacts in an abutment limiting relationship with a pin 655 fixed in and projecting from the rear face of negator gear 625 at the end-of-tape position and start-of-tape position, thereby providing a positive mechanical safety stop at both positions.

Commutator gear shaft 652 is rotatably fitted in co-aligned holes in the spaced apart fore and aft walls of the auxiliary bracket 536, so the dielectric gear 631 is disposed to continually mesh with the negator shaft pinion 630 and is maintained in axial position by a collar 656 fastened by a set screw.

The spaced-apart auxiliary bracket walls are both pierced by an aligned set of four holes 658 and 659 which are made of sufficient size to permit coaxial positioning of the four contact plungers 645–648 with clearance, only one plunger 645 being shown in FIGURE 26. Overlying the holes 658 and suitably fastened to one wall of the auxiliary bracket plate 536, is one dielectric plate 660 with four plunger head guide holes 661 coaxially disposed relative to associated holes 658. Overlying the holes 659 and suitably fastened to the other wall of the auxiliary bracket 536 is a second dielectric plate 662 with four plunger shank guide holes 663, coaxially disposed relative to associated holes 659 and to the associated plunger head guide holes 661.

All four contact plungers are like the one plunger 645 seen in FIGURE 26, each plunger being made of highly conductive material, e.g., bronze or silver plated steel or copper, and having a contact bearing head 666 which is guided in one of the large guide holes 658 and a reduced diameter shank 668 which is guided in an associated small guide hole 663. Each plunger head 666 is spring biased against its appropriate commutator contact strip, which is strip 641 for plunger 645, by a coil compression spring 668 which is retained between dielectric plate 662 and a washer 669 placed over the plunger shank and against the shoulder of the plunger head 668. The appropriate electrical connections are made to the ends of the plunger shanks and tie the commutator into the recorder circuit indicated in detail FIGURE 28 (see also logic diagram FIGURE 11).

REWIND: After a message has been recorded, it is necessary to rewind the magnetic tape 540 before transmitting to the outgoing line. Power to rewind the tape 540 is obtained from the negator spring 625. To initiate rewind of the tape 540, the rewind solenoid 254, which is mounted on the rear face of front mounting plate 532 (see FIGURES 21 and 18) is energized, pulling its plunger 674 into the coil against the stress of a solenoid plunger spring. A U-shaped rewind bracket 675 with an arm pivotally attached to the end of solenoid plunger 674 rotates counterclockwise around its pivot mounting on the feed shaft 558 adjacent the feed ratchet 556 and feed shaft gear 569. This REWIND movement of bracket 675 moves two diametrically disposed bent lugs 676 and 677 (one seen in FIGURE 21 and both shown in FIGURE 22) into respective engagement with the aforedescribed feed pawl and feed detent pawl release fingers 564 and 565 to pivot both pawls 555 and 562 clockwise away from engagement with feed ratchet 556, against the bias force of their respective springs 559 and 563.

At the same time that it releases the feed shaft ratchet 556, which frees the feed shaft 558 to rotate in its reverse or rewind direction under the stored power in the negator spring 626, a third ear 678 on the rewind bracket 675 moves away from an abutment 679 on the idler shift gear lever 611. A connecting tension spring 680 from rewind bracket 675 to idler shift lever 611 pulls the idler shift lever 611 counterclockwise and moves the idler gear 610 out of engagement with the drive gear 601' of the take-up spool 566 and engages the idler gear with the supply spool drive gear 601.

Attached to another ear 681 of the rewind solenoid bracket 675 is an upright link 682, the upper end of which carries a roller 683 projecting forward through a vertical guide slot 684 in the front mounting plate 532. Turning now to FIGURE 20, and with continued reference to FIGURE 18, the upward shift of the link carried roller 683 during the rewind shift of solenoid bracket 675 causes the roller to engage and lift a tape pressure arm 685. Pressure arm 685 is pivoted on a post 686 in the front mounting plate and has a soft tape pressure pad 687. A depending arm 688 on pressure arm 685 is biased by spring 548 in a direction which causes pad 687 to press the magnetic tape 540 against the recording head 542 during record and playback. When the roller 683 is raised upwardly, and the pressure arm 685 is thus raised to release the pressure of pad 687, a pin 689, which is abutted by the stabilizer roller lever under bias force of spring 548, forces the stabilizer roller lever counterclockwise to release the stabilizer roller pressure on tape 540.

With the rewind solenoid bracket 675 rotated by energization of rewind solenoid 254, the negator spring 626 is now free to unwind from the spring output spool 628 back onto the negator supply spool 627. This action causes negator spool gear 625 to drive the tape feed sprocket shaft 558 backwards which through the described gear train drives both the feed sprocket 543 and stepping sprocket 549 backwards at the same speed, pulling the tape 540 from the now disengaged, freely rotatable take-up spool 566, around the stepping sprocket wheel, over the recording head, past the feed sprocket and to the positively driven tape supply spool 541, the idler gear 610 now being enmeshed with the tape supply spool drive gear 601, and driven backwards by the feed shaft gear 569.

When the tape is fully rewound, the previously described stop arm finger 653 on the commutator gear 631 hits the stop pin 655 on the negator gear 625, affording a mechanical stop of the rewind rotation. Also the start-of-tape strip 641 on the commutator gear is shorted by the contact plunger 645, which (see FIGURE 11B) lights the green start of tape lamp 139, starts the advance multivibrator 242 which sets the REWIND register 252 de-energizing the rewind solenoid 254 and, as has been previously described, feeds and steps the magnetic tape 540 three or more times as necessary to rotate the commutator away from start position. When the tape has stepped three times, the recorder is ready to play back the message or record a new message.

FIGURE 29 is a greatly enlarged segment of tape 540 illustrating how the pulses of a single character are stored along with eight sync clock pulses in two track, digital serial form on the tape during the stepping movement.

The invention may be embodied in other specific forms without departing from the spirit or essential characteristics thereof. The present emdodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is.

1. A multiple bit code signal communication transmission apparatus comprising a magnetic tape recorder-reader set with multiple track recording and playback head means, means for stepping a magnetic tape past said head means and storing in said tape and reading from said tape information signal units consisting of multiple bit codes in serial digital form and serial digital clock pulses corresponding at least to all possible bit positions of said code; a transmitter having means enabling origination, receipt and storage of code signal information and transmission of the stored code signal information comprising an electronic parallel register to receive and store parallel bits of code signal information and a low-speed electronic transmission means to read-out and serially transmit the code signal bits from said parallel register; and circuitry means connected between said magnetic tape recorder-reader set and said transmitter including high-speed electronic means to enable read-out of code signal bits from said parallel register and to store such bits in high-speed serial digital coded order along with storage of corresponding code bit clocking pulses in the magnetic tape and, in accord with the logic represented by the serially recorded clocking pulses and serially recorded code bit pulses, to accomplish high-speed serial read-out of code signals from the tape and conversion of said serial code signal, through said parallel register, for serial transmission through said low-speed electronic transmission means.

2. A multiple bit code signal communication apparatus as claimed in claim 1, wherein said circuitry means comprises selective mode cotnrol means enabling remote self-contained operation of receiving, recording on, rewind of and playback transmission of digital serial code information signal bits from magnetic tape.

3. A multiple bit code signal communication transmission apparatus as defined in claim 2, wherein said transmitter is a keyboard transmitter including a keyboard code generator; and wherein said mode control means enables selective code transmisison output under control of said keyboard code generator and of said recorder-reader set and further includes means enabling conjoint transmission of serial code form information from said parallel register at a transmission rate controlled by said low speed transmission means and of the same code information in parallel code form from said parallel register to and through said high speed electronic means to storage in said recorder-reader set.

4. A transmitter and tape recorder-reader set as defined in claim 1, wherein:
said high-speed electronic means in said recorder includes a high-speed parallel-to-serial code convertor with means for generating corresponding code bit syinchronized clock pulses, and synchronized clock pulsed recording means to record both the said converted parallel-to-serial information and corresponding synchronizing clock pulses on moving magnetizable tape in serial digital bit form.

5. A transmitter and tape recorder-reader set as defined in claim 4, wherein:
(a) said electronic means in said high-speed recorder further includes a high-speed serial-to-parallel code convertor, and means to playback and gate said serial digital form recording of information code pulses and corresponding clock pulses through said high-speed serial-to-parallel code convertor to transmit said tape recorded serial coded information in parallel bit form.

6. A transmitter and tape recorder set as defined in claim 5, wherein:

said low-speed transmisison means includes means to gate parallel code information from said parallel register to an outgoing transmission line; and means connect the parallel code information and output of said recorder high-speed serial-to-parallel code convertor to corresponding inputs of said transmitter parallel code information register for low-speed transmission in serial form through said transmitter low-speed transmission means.

7. A transmitter and tape recorder-reader set as defined in claim 6, wherein:
(a) said circuitry means includes means to inhibit transmitter generation of coded signals in said parallel register whenever said recorder is transmitting playback information.

References Cited by the Examiner

UNITED STATES PATENTS

| | | | |
|---|---|---|---|
| 2,831,058 | 4/1958 | Finchq | 178—26.5 |
| 2,838,603 | 6/1958 | Hudec | 178—17.5 |
| 2,932,816 | 4/1960 | Stiefel et al. | 178—79 |
| 2,958,850 | 11/1960 | Glenner et al. | 178—17.5 |
| 3,059,048 | 10/1962 | Lamin et al. | 178—17.5 |

NEIL C. READ, *Primary Examiner.*

T. A. ROBINSON, *Assistant Examiner.*